United States Patent
Jennrich et al.

(10) Patent No.: US 10,665,912 B2
(45) Date of Patent: May 26, 2020

(54) BATTERY SYSTEM WITH POTTING COMPOUND

(71) Applicant: Robert Bosch GmbH, Stuttgart (DE)

(72) Inventors: Irene Jennrich, Kernen-Stetten (DE); Michael Raedler, Hamburg (DE); Klaus-Volker Schuett, Wernau (DE); Thomas Gerschwitz, Eberdingen-Hochdorf (DE); Andreas Birkhold, Leinfelden-Echterdingen (DE); Mattis Simeon Weiss, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 15/765,943

(22) PCT Filed: Sep. 9, 2016

(86) PCT No.: PCT/EP2016/071313
§ 371 (c)(1),
(2) Date: Apr. 4, 2018

(87) PCT Pub. No.: WO2017/060038
PCT Pub. Date: Apr. 13, 2017

(65) Prior Publication Data
US 2018/0301771 A1      Oct. 18, 2018

(30) Foreign Application Priority Data

Oct. 6, 2015 (DE) .......................... 10 2015 219 280

(51) Int. Cl.
*H01M 10/653* (2014.01)
*H01M 10/655* (2014.01)
(Continued)

(52) U.S. Cl.
CPC ............. *H01M 10/653* (2015.04); *C08K 3/36* (2013.01); *C08L 63/00* (2013.01); *C08L 83/04* (2013.01);
(Continued)

(58) Field of Classification Search
CPC ............. H01M 10/653; H01M 2/1016; H01M 10/6557; H01M 10/6555
See application file for complete search history.

(56) References Cited

U.S. PATENT DOCUMENTS

2007/0218353 A1* 9/2007 Straubel ................ B60L 3/0046
                                                          429/120
2008/0193830 A1* 8/2008 Buck ................... H01M 2/1077
                                                          429/120
(Continued)

FOREIGN PATENT DOCUMENTS

DE      102007010748 A1      8/2008
DE      102007010751 A1      8/2008
(Continued)

OTHER PUBLICATIONS

International Search Report for PCT/EP2016/071313, dated Jan. 19, 2017.

*Primary Examiner* — Stewart A Fraser
(74) *Attorney, Agent, or Firm* — Norton Rose Fulbright US LLP; Gerard Messina

(57) ABSTRACT

A method for manufacturing a battery system, in which to manufacture, simply and inexpensively, a battery system having improved service life, performance, and safety, in the method battery cells are positioned by at least one mounting grid for positioning battery cells and/or by positioning ribs and/or positioning projections in the interior space of a battery system housing or of a potting mold which are configured for positioning battery cells, and/or by a mounting gripper for positioning battery cells, and at least partly (Continued)

potted with at least one potting compound. Also described are a corresponding battery system and a suitable reactive resin system or a suitable potting compound.

24 Claims, 16 Drawing Sheets

(51) Int. Cl.
| | |
|---|---|
| H01M 2/16 | (2006.01) |
| H01M 2/10 | (2006.01) |
| H01M 10/6555 | (2014.01) |
| C08L 63/00 | (2006.01) |
| H01M 10/6556 | (2014.01) |
| H01M 2/02 | (2006.01) |
| C08K 3/36 | (2006.01) |
| C09D 163/00 | (2006.01) |
| C08L 83/04 | (2006.01) |
| H01M 10/613 | (2014.01) |
| H01M 10/6557 | (2014.01) |
| C08K 3/22 | (2006.01) |
| C08K 3/38 | (2006.01) |

(52) U.S. Cl.
CPC ........ *C09D 163/00* (2013.01); *H01M 2/0237* (2013.01); *H01M 2/1016* (2013.01); *H01M 2/1094* (2013.01); *H01M 2/166* (2013.01); *H01M 2/1653* (2013.01); *H01M 10/613* (2015.04); *H01M 10/655* (2015.04); *H01M 10/6555* (2015.04); *H01M 10/6556* (2015.04); *H01M 10/6557* (2015.04); *C08K 2003/2227* (2013.01); *C08K 2003/382* (2013.01); *C08L 2203/20* (2013.01); *C08L 2205/025* (2013.01); *C08L 2205/03* (2013.01)

(56) References Cited

U.S. PATENT DOCUMENTS

| | | | |
|---|---|---|---|
| 2010/0136396 A1* | 6/2010 | Hermann | H01M 2/1077 429/99 |
| 2010/0136413 A1* | 6/2010 | Hermann | H01M 2/1077 429/149 |
| 2011/0244245 A1 | 10/2011 | Elgimiabi | |
| 2017/0077468 A1* | 3/2017 | Gerundt | H01M 2/1077 |

FOREIGN PATENT DOCUMENTS

| | | |
|---|---|---|
| DE | 102007063187 B3 | 4/2009 |
| DE | 102007063179 A1 | 6/2009 |
| DE | 102008005155 A1 | 7/2009 |
| DE | 102010046530 A1 | 3/2012 |
| DE | 102014106852 A1 | 11/2015 |
| EP | 1835251 A1 | 9/2007 |
| WO | 2007004184 A1 | 1/2007 |

* cited by examiner

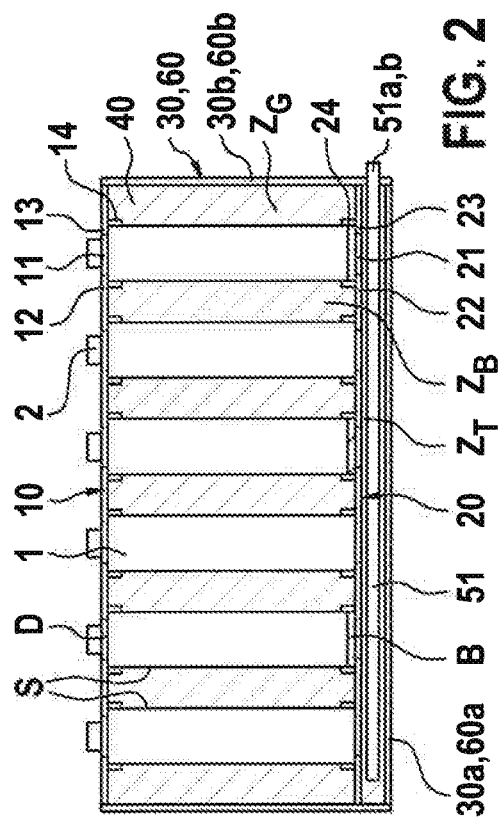
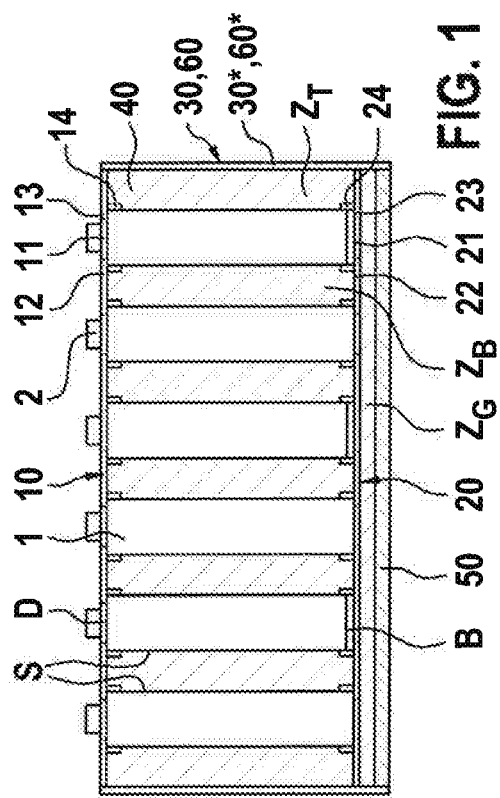
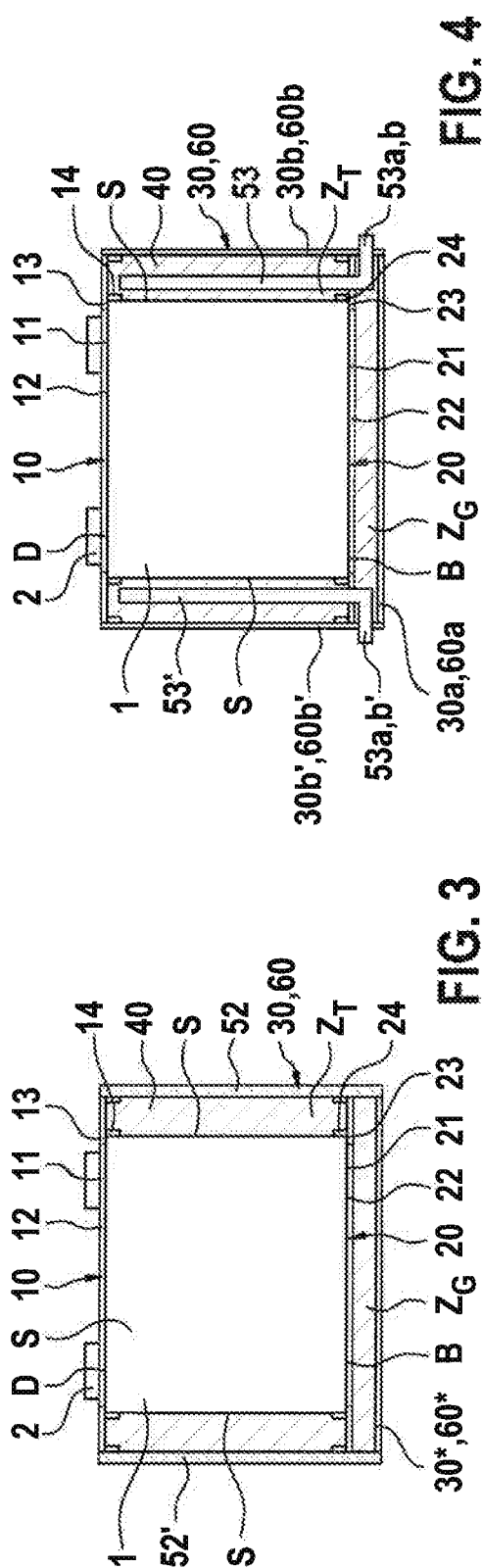

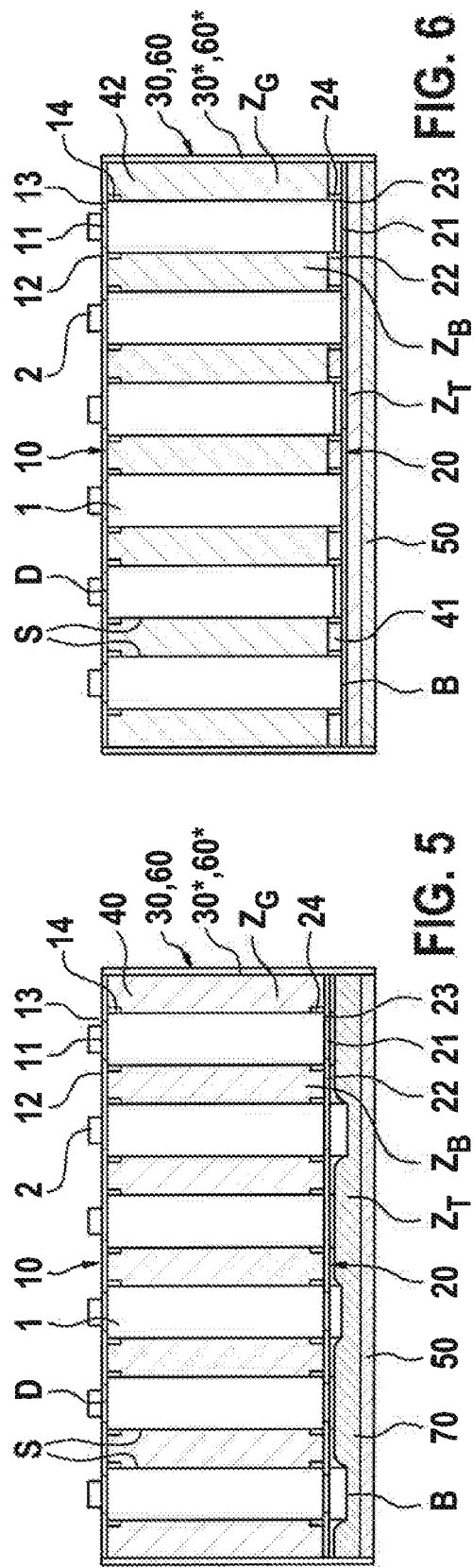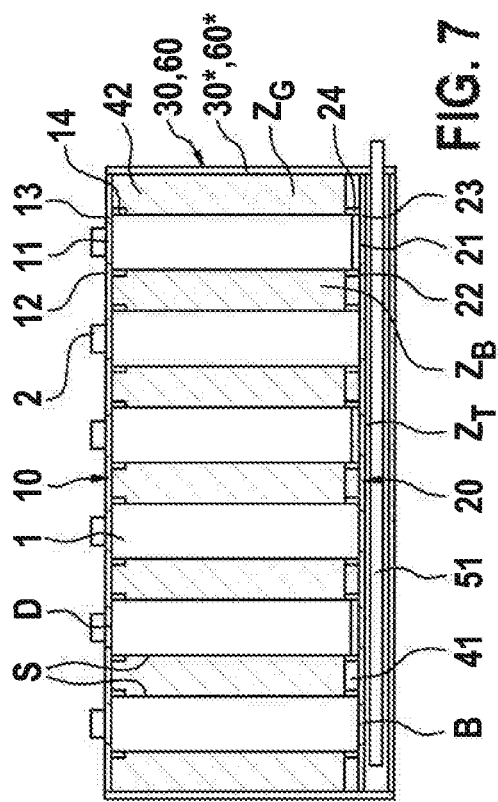

BATTERY SYSTEM WITH POTTING COMPOUND

FIELD OF THE INVENTION

The present invention relates to a method for manufacturing a battery system, to a battery system, and to a reactive resin system or a potting compound.

BACKGROUND INFORMATION

Battery systems made up of several battery cells are used, inter alia, in electric vehicles or hybrid electric vehicles. The battery cells can be packaged in plastic films, or painted.

Plastics, however, as a rule have low thermal conductivity, for example approximately 0.2 to 0.4 W/(m·K). In addition, plastic films or paints as a rule have little abrasion resistance.

The documents DE 10 2007 010 748 A1 and DE 10 2007 010 751 A1 relate to battery housings.

The document DE 10 2007 063 179 A1 relates to a battery constituting a flat cell composite having a thermal conduction plate.

SUMMARY OF THE INVENTION

The subject matter of the present invention is a method for manufacturing a battery system.

In the method, in particular battery cells can be positioned, for example by way of at least one mounting grid for positioning battery cells and/or by way of positioning ribs and/or positioning projections in the interior space of a battery system housing or of a potting mold which are configured for positioning battery cells, and/or by way of a mounting gripper for positioning battery cells, and at least partly potted with at least one potting compound.

For instance, the method can be configured for manufacturing a battery module and/or battery pack. For example, the method can be configured for manufacturing a lithium battery system, for example a lithium battery module and/or a lithium battery pack, for instance a lithium-ion battery module and/or a lithium-ion battery pack. The battery cells can be in particular lithium cells, for instance lithium-ion cells. For instance, the battery cells can each have an, in particular solid or rigid, for example metallic, cell housing. For example, the battery cells can be, in particular, prismatic housing cells, called "hard case cells," for instance prismatic cells.

Improved heat dissipation or heat discharge and, for example, also improved temperature control as well as improved electrical insulation and improved dielectric strength of the battery cells or battery system, for example in the form of a battery module and/or battery pack, can advantageously be achieved by way of the at least one potting compound. As a result, the service life and also the performance and reliability of the battery cells or battery system can in turn advantageously be enhanced.

In addition, mechanical protection, for example with respect to vibration and/or with respect to abrasion, for example metal abrasion, and/or abrasive wear, for instance under mechanical stress, e.g. under a shaking load, and/or impact damping, can advantageously be implemented by way of the at least one potting compound. What can be brought about by way of the potting compound is, for instance, that particles, such as metal particles, dust, dirt, etc., which might adhere to the surfaces of the battery cells or the housing wall in the production process, are, so to speak, "swallowed" by the potting compound and as a result no longer have a direct abrasive effect; and/or that particles can no longer penetrate into gaps during operation, with the result that abrasion resistance can be appreciably improved. The service life, performance, and reliability of the battery cells, and thus of the battery system, can advantageously be improved in these ways.

In addition, the battery cells or the battery system can be protected from external influences, for example from media such as electrolyte, water vapor, moisture, and/or solvents, by way of the at least one potting compound, and in this manner as well the service life, performance, and reliability of the battery cells, and thus of the battery system, can be improved.

Furthermore, production tolerances of the components, for example the overall heights of the battery cells, can advantageously be equalized by way of the at least one potting compound, in particular in combination with the at least one mounting grid, the positioning ribs and/or positioning projections, or the mounting gripper. The at least one mounting grid, the positioning ribs and/or positioning projections, or the mounting gripper can serve in particular as mounting aids with which, advantageously, leveling of the battery cells is achieved and as a result, in combination with the at least one potting compound, tolerance equalization can advantageously be achieved.

Installation moreover advantageously can be simplified and, furthermore, great flexibility in terms of configuration and thus implementation in various applications is enabled, by way of the at least one mounting grid, the positioning ribs and/or positioning projections, or the mounting gripper, and/or the at least one potting compound.

The method can furthermore advantageously be carried out using a smaller number of process steps and at less cost; and, for example, a battery system made up of several battery cells, for instance a module and/or pack made up of several cells, can be manufactured in one working step.

All in all, a battery system having improved service life, performance, and reliability can thereby advantageously be manufactured in a simple and inexpensive manner.

In the context of an embodiment, the battery cells are introduced into an interior space of an or of the battery system housing or of an or of the potting mold, and/or the interior space of the battery system housing or of the potting mold is filled at least partly with at least one potting compound.

For instance, the interior space of the battery system housing or of the potting mold can be filled up at least partly, for example, in particular substantially completely, with at least one potting compound. For example, the interior space of the battery system housing or of the potting mold can firstly be partly filled with a first potting compound (explained later) and then, for example, in particular substantially completely, filled up with a second potting compound (explained later), or the interior space of the battery system housing or of the potting mold can, for example, firstly be partly filled with a preform (explained later) and then, for example, in particular substantially completely, filled up with the at least one potting compound.

To the extent that, in the context of filling of the interior space of the battery system housing or of the potting mold, the battery cells or the at least one temperature control conduit (explained later) are at least partly potted with the potting compound, the battery cells or the at least one temperature control conduit can be introduced into the interior space of the battery system housing or of the potting mold in particular prior to potting with the potting compound. In particular, after introduction and positioning of the battery cells or of the at least one temperature control conduit, the interior space of the battery system housing or of the potting mold can (then) be at least partly filled, for example filled up, with at least one potting compound.

To the extent that, upon filling of the interior space of the battery system housing or of the potting mold, the battery cells are (firstly) not potted with potted compound, for example to the extent that, as explained later, (firstly) only at least one temperature control apparatus-spacing interstice, for example in which the at least one temperature control conduit can be disposed, is filled with a first potting compound and (only then) the battery cells or the at least one battery cell-spacing interstice are filled with a second potting compound, the battery cells can, for example, also be introduced into the interior space of the battery system housing or of the potting mold after potting with the first potting compound. The at least one temperature control conduit can be introduced into the interior space of the battery system housing or of the potting mold, in particular, before potting with the first potting compound.

The battery system can have, for example, a battery system housing having an interior space for the reception of battery cells. The battery system housing can be configured, for example, from plastic, for instance can be a plastic housing, or configured from metal, for instance can be a metal housing. For instance, the battery system housing, for example the metal housing, can be or become manufactured by deep drawing, cold extrusion, and/or die-casting, etc., and/or can have a configuration assembled, for example, by riveting, soldering, welding, adhesive bonding, and/or upsetting, etc.

The at least one mounting grid can be embodied, in particular, from plastic.

To the extent that the battery cells are positioned by way of the at least one mounting grid, it is possible both (firstly) to introduce the battery cells and the at least one mounting grid into the interior space of the battery system housing or of the potting mold and (then) to position them and (then) pot them, and also, in particular, (firstly) to (pre-)position the battery cells by way of the at least one mounting grid and (then) to introduce the battery cells, (pre-)positioned by way of the at least one mounting grid, into the interior space of the battery system housing or potting mold and (then) to pot them. In both cases the battery cells can be positioned or oriented and/or held in position by way of the at least one mounting grid. The at least one mounting grid can moreover advantageously, inter alia, prevent contact between the battery cells and the battery system housing, for instance in the form of a metal housing. To the extent that the battery cells are positioned by way of the at least one mounting grid, made in particular of plastic, the battery system housing can in particular be both a metal housing and a plastic housing.

To the extent that the battery cells are positioned by way of the positioning ribs and/or positioning projections of the battery system housing or of the potting mold, the battery cells can be positioned or oriented and/or held in position, in particular directly, upon introduction, for example insertion, into the interior of the battery system housing or of the potting mold by way of the positioning ribs and/or positioning projections integrated thereinto, and (then) potted. Uniform potting gaps around the cells can thereby advantageously be implemented. To the extent that the battery cells are positioned by way of positioning ribs and/or positioning projections of the battery system housing, the battery system housing can, in particular, be a plastic housing.

To the extent that the battery cells are positioned by way of the mounting gripper, the battery cells can be positioned, for example, by way of the mounting gripper in the interior space of the battery system housing or of the potting mold, and (then) potted.

To the extent that the battery cells are introduced into the interior space of a battery system housing, for example a plastic housing or a metal housing, the battery cells advantageously can be potted, in particular directly, in the battery system housing. After curing of the at least one potting compound, the battery cells, the at least one potting compound, and the battery system housing, in particular the battery cells, the at least one potting compound, and the battery system housing as well as e.g. further components, such as the at least one mounting grid and/or the positioning ribs and/or positioning projections and/or the at least one temperature control conduit and/or the preform (explained later), can constitute a potting-compound unit encompassing the battery cells. The battery system housing can have at least one mounting apparatus, for example mounting tabs and/or mounting angle pieces and/or a mounting plate, by way of which it can be mounted, for instance bolted, clamped, riveted, and/or adhesively bonded, etc. on a holding apparatus, for example on a holding plate or holding frame, for instance of a vehicle, for example of an electric and/or hybrid vehicle, and/or on a temperature control element, for example a temperature control plate, for instance a cooling element or a cooling plate.

The potting mold can be, for example, a reusable mold or an expendable mold. The potting mold can in particular be a reusable mold.

To the extent that the battery cells are introduced into the interior space of a potting mold, the battery cells can (firstly) be potted in the potting mold. After curing of the at least one potting compound, the battery cells and the at least one potting compound, in particular the battery cells and the at least one potting compound as well as, for example, further components such as the at least one mounting grid and/or the positioning ribs and/or positioning projections and/or the at least one temperature control conduit and/or the preform (explained later), can constitute a potting-compound unit that encompasses the battery cells and can be detached or removed from the potting mold. To the extent that the potting mold is a reusable mold, the potting mold can then be reused.

The potting-compound unit encompassing the battery cells can optionally also be used without an additional battery system housing. For example, the potting-compound unit encompassing the battery cells can simply be set into a mounting frame and/or attached thereon and/or mounted, for instance bolted, clamped, riveted, and/or adhesively bonded, etc., on a mounting plate and/or on a holding apparatus, for example on a holding plate or holding frame, for instance of a vehicle, for example of an electric and/or hybrid vehicle, and/or on a temperature control element, for example a temperature control plate, for instance a cooling element or a cooling plate.

For example, at least two battery cells, for example at least five battery cells, for instance at least six battery cells, can be positioned by way of the at least one mounting grid and/or by way of the positioning ribs and/or positioning projections and/or by way of the mounting gripper.

In the context of a further, alternative or additional embodiment the battery cells are positioned, in particular prior to potting with potting compound, for example before, during, or after introduction into the interior space, by way of the at least one mounting grid and/or by way of the positioning ribs and/or positioning projections and/or by way of the mounting gripper with a spacing from one another with formation of at least one battery cell-spacing interstice, or with a spacing from an or from the battery system housing or from an or from the potting mold with formation of at least one housing-spacing or potting mold-spacing interstice, or with a spacing from an or from the temperature control apparatus, for example from an or from the temperature control plate and/or temperature control conduit, with formation of at least one temperature control apparatus-spacing interstice, the at least one battery cell-spacing interstice and/or the at least one housing-spacing or potting mold-spacing interstice and/or the at least one temperature control apparatus-spacing interstice being filled, in particular after introduction and positioning of the battery cells and optionally of a temperature control conduit (explained later), with at least one potting compound.

In the context of a further, alternative or additional embodiment, the battery cells are inserted into the at least mounting grid in particular before, during, or after introduction into the interior space of the battery system housing or of the casting mold. The battery cells can advantageously be positioned by insertion into the at least one mounting grid.

The at least one mounting grid can be configured, for example, as described in conjunction with the battery system according to the present invention.

For example, a battery cell can be inserted respectively into each grid opening of the at least one mounting grid. For instance, the battery cells can each be surrounded peripherally by grid opening-forming grid bars of the at least one mounting grid.

In the context of a configuration of this embodiment, the battery cells are inserted into an upper mounting grid for positioning battery cells, and/or into a lower mounting grid for positioning battery cells. In particular, the battery cells can be inserted into an upper mounting grid for positioning battery cells and into a lower mounting grid for positioning battery cells.

In the context of a further, alternative or additional configuration of this embodiment, a mounting grid/battery cell assemblage is constituted, in particular before introduction of the battery cells into the interior space of the battery system housing or of the potting mold, by insertion of the battery cells into the at least one mounting grid, for example into the upper and/or lower mounting grid, which assemblage is (then) introduced into the interior space of the battery system housing or of the potting mold.

The at least one potting compound can be introduced, for example, through at least one potting compound inlet opening in the at least one mounting grid, in particular in the upper mounting grid, which opening is configured, for example, in a grid opening-forming grid bar.

In the context of a further, alternative or additional embodiment, the battery cells are inserted, in particular during introduction into the interior space of the battery system housing or of the potting mold, between the positioning ribs and/or positioning projections into the interior space of the battery system housing or of the potting mold. The battery cells can advantageously be positioned by insertion between the positioning ribs and/or positioning projections into the interior space of the battery system housing or of the potting mold.

The positioning ribs and/or positioning projections can be configured, for example, as described in conjunction with the battery system according to the present invention.

In the context of a further, alternative or additional embodiment, the battery cells are grasped by the mounting gripper, in particular before introduction into the interior space of the battery system housing or of the potting mold. The battery cells can be introduced by way of the mounting gripper into the interior space of the battery system housing or of the potting mold. The battery cells can advantageously be positioned, in particular, by being grasped by the mounting gripper and by being introduced by way of the mounting gripper.

In the context of a further, alternative or additional embodiment, furthermore at least one temperature control conduit is introduced, in particular before introduction of the battery cells, into the interior space of the battery system housing or of the potting mold. Upon potting with potting compound the at least one temperature control conduit can (then) in particular also be at least partly potted with at least one potting compound. For example, the at least one temperature control conduit can be encased in potting compound, in particular upon potting with potting compound. The at least one temperature control conduit can be embodied, for example, in the form of a conduit loop or a conduit pipe, for instance a so-called cooling loop. Temperature control by way of a temperature control apparatus can thereby advantageously be integrated in simple fashion into the battery system.

In the context of a configuration of this embodiment, the at least one temperature control conduit is disposed alongside and/or below the battery cells. Lateral cooling and/or bottom cooling can thereby advantageously be implemented in simple fashion. For example, in particular upon potting with potting compound, the at least one temperature control conduit can be encased in potting compound alongside and/or below the battery cells. Good heat dissipation can thereby advantageously be achieved.

For example, the at least one temperature control conduit can be disposed between battery cells, in particular lateral surfaces of the battery cells, and a side wall of the battery system housing or of the potting mold, and/or between battery cells, in particular bottom surfaces of the battery cells, and the bottom of the battery system housing or of the potting mold.

In particular, the at least one temperature control conduit can be disposed, for example fastened, on an inner surface of at least one side wall and/or of a bottom of the battery system housing or of the potting mold. For instance, at least two temperature control conduits can be disposed, for example fastened, on inner surfaces of, in particular mutually oppositely located, side walls of the battery system housing or of the potting mold. Alternatively or in addition thereto, a temperature control conduit can be disposed, for example fastened, on the inner surface of the bottom of the battery system housing or of the potting mold.

For instance, the at least one temperature control conduit can be partly embedded into the material of the battery system housing or of the potting mold, for example clamped therein or molded thereonto. For example, the at least one temperature control conduit can be partly embedded into the material of at least one side wall and/or of the bottom of the battery system housing or of the potting mold, for example clamped therein or molded thereonto.

The at least one temperature control conduit can be connectable in particular via temperature control conduit connectors that are disposed in particular outside the battery system housing or the potting mold.

For example, the at least one temperature control conduit can be passed through a side wall of the battery system housing or of the potting mold. For instance, at least two temperature control conduits can be passed through, for example mutually oppositely located, side walls of the battery system housing or of the potting mold.

In the context of a further, alternative or additional embodiment, the battery system housing or the potting mold is equipped with at least one temperature control plate. For example, the at least one temperature control plate can be disposed, for example fastened, alongside and/or below the battery cells. Lateral cooling and/or bottom cooling can thereby advantageously be implemented in simple fashion. Upon potting with potting compound, the at least one temperature control plate can (then) in particular also be at least partly potted with at least one potting compound. Temperature control by way of a temperature control apparatus can thereby once again advantageously be integrated in simple fashion into the battery system.

In the context of a configuration of this embodiment, at least one temperature control plate forms at least one side wall and/or the bottom of the battery system housing or of the potting mold. The battery system housing or the potting mold can in particular be in two parts, for example at least three parts, for instance several parts. Particularly good heat dissipation can thereby advantageously be achieved.

In the context of a special configuration of this embodiment, the battery system housing or the potting mold is assembled, for example before introduction of the battery cells and in particular before potting with potting compound, from a base element, for example in the form of a frame or a plate, and from at least one temperature control plate delimiting the interior space of the battery system housing or of the potting mold, for example serving as a side wall and/or bottom of the battery system housing or of the potting mold. Upon potting with potting compound, the at least one temperature control plate can (then) in particular also be at least partly potted with at least one potting compound.

The at least one potting compound can in particular be electrically insulating and, optionally, thermally insulating.

The at least one potting compound can be curable in particular at a temperature 60° C., for example in a temperature range between room temperature and 60° C.

To the extent that the at least one potting compound is curable at room temperature, curing of the at least one potting compound can advantageously occur by itself or without heating. To the extent that the at least one potting compound is curable at a temperature above room temperature, the at least one potting compound can be heated, in particular after potting, for example to a temperature 60° C.

The at least one potting compound can, for instance, encompass a reactive resin system according to the present invention or can be a potting compound according to the present invention.

In the context of a further, alternative or additional embodiment (double potting, two-phase potting), (firstly) the at least one temperature control apparatus-spacing interstice is filled with a first potting compound, and (then) the at least one battery cell-spacing interstice and/or the at least one housing-spacing or potting mold-spacing interstice is filled with a second potting compound. Thanks to the use of several potting compounds, the latter can advantageously be optimized for their respective functions.

In particular, the first potting compound can be thermally conductive and electrically insulating. The second potting compound can be, in particular, electrically insulating.

In the context of a configuration of this embodiment, the first potting compound has a higher thermal conductivity than the second potting compound. Heat flux from the battery cells to the temperature control apparatus can thereby advantageously be optimized by way of the first potting compound.

In the context of a further, alternative or additional configuration of this embodiment, the second potting compound has a higher electrical resistance than the first potting compound. Electrical insulation of the battery cells from one another or externally can thereby advantageously be optimized by way of the second potting compound.

In the context of a further, alternative or additional configuration of this embodiment, the second potting compound has a lower, in particular plastic, yield point and/or viscosity than the first potting compound. Impact damping between the battery cells or externally can thereby advantageously be optimized by way of the second potting compound.

In the context of a further, special configuration of this embodiment, potting with the first and the second potting compound occurs wet-in-wet. Thermal transitioning between the, in particular highly thermally conductive, first potting compound and the, in particular less thermally conductive, second potting compound can thereby advantageously be improved.

For example, the first potting compound can encompass a reactive resin system according to the present invention or can be a potting compound according to the present invention, which system or compound is filled, in particular highly filled, with at least one thermally conductive filler. The first potting compound can thereby advantageously introduce high thermal conductivity for thermal linking of the battery cells. The second potting compound can be in particular an electrically insulating potting compound, for example a modified, filled epoxy potting compound, for instance a potting compound according to the present invention, in particular having good electrical insulation capability.

In the context of a further, alternative embodiment (single potting), (firstly) in particular before introduction of the battery cells and/or before filling with potting compound, a preform is disposed in the at least one temperature control apparatus-spacing space or interstice and (then) the at least one battery cell-spacing interstice and/or the at least one housing-spacing or potting mold-spacing interstice is filled with a potting compound. The preform can be, for example, a mat or a pad, in particular an elastomer mat or an elastomer pad, for example a so-called GapPad, made for instance of a thermal interface material (TIM), in particular for thermal contacting of the battery cells. For example, the preform can have a higher thermal conductivity than the potting compound, and/or the potting compound can have a higher electrical resistance than the preform, and/or the preform can have a lower coefficient of friction than the potting compound, and/or the potting compound can have a lower yield point and/or viscosity than the preform.

In the context of a further, alternative or additional embodiment (single potting), the at least one temperature control apparatus-spacing interstice, the at least one battery cell-spacing interstice, and the at least one housing-spacing or potting mold-spacing interstice are filled with a potting compound.

In particular in the case of single potting, the at least one potting compound can be, for example, a modified, filled epoxy potting compound, in particular having good electrical insulation capability.

Optionally, thermally conductive layers and/or films made of a thermal interface material (TIM) can additionally be introduced, for example applied, on the bottom and/or on the side walls of the battery system housing.

With regard to further technical features and advantages of the method according to the present invention, reference is herewith explicitly made to the explanations in conjunction with the battery system according to the present invention and the reactive resin system according to the present invention or the potting compound according to the present invention, and to the Figures and the description of the Figures.

A further subject of the present invention is a battery system that encompasses battery cells and/or is manufactured by way of a method according to the present invention.

The battery cells can, in particular, be at least partly potted with at least one potting compound.

The battery system can have, for example, a battery system housing having an interior space for the reception of battery cells. The battery system housing can be embodied, for example, from plastic, for instance can be a plastic housing, or can be embodied from metal, for instance can be a metal housing.

For example, the battery system can be a lithium battery system, for example a lithium battery module and/or a lithium battery pack, for instance a lithium-ion battery module and/or a lithium-ion battery pack. The battery cells can be in particular lithium cells, for instance lithium-ion cells. For instance, the battery cells can each have an, in particular solid or rigid, for example metallic, cell housing. For example, the battery cells can be, in particular, prismatic housing cells, called "hard case cells," for instance prismatic cells.

In the context of an embodiment, the battery cells are positioned by way of at least one mounting grid for positioning battery cells, and/or by way of positioning ribs and/or positioning projections in the interior of a battery system housing, which are configured for positioning battery cells. The battery cells and the at least one mounting grid and/or the positioning ribs and/or positioning projections of the battery system housing can in particular be at least partly potted with at least one potting compound.

The battery cells can advantageously be oriented, and positioned or held in position, by way of the at least one mounting grid and/or by way of the positioning ribs and/or positioning projections of the battery system housing. In particular, the battery cells can be spaced apart by way of the at least one mounting grid and/or by way of the positioning ribs and/or positioning projections of the battery system housing. For example, the battery cells can be disposed by way of the at least one mounting grid and/or by way of the positioning ribs and/or positioning projections of the battery system housing with a spacing from one another and/or with a spacing from a battery system housing, for example with a spacing from a wall of the battery system housing, and/or with a spacing from the outer side of a potting-compound unit encompassing the battery cells and/or with a spacing from a temperature control apparatus. Uniform potting-compound portions between the battery cells and/or between the battery cells and a battery system housing, for example between the battery cells and a wall of the battery system housing, and/or between the battery cells and the outer side of a potting-compound unit encompassing the battery cells and/or between the battery cells and a temperature control apparatus, can thereby advantageously be achieved.

For instance, the battery system can encompass at least two battery cells, for example at least five battery cells, for instance at least six battery cells.

The instance, the at least one mounting grid, for instance the upper mounting grid and/or the lower mounting grid, and/or the positioning ribs and/or positioning projections, and/or the mounting gripper used upon manufacture, can be configured for positioning at least two battery cells, for example at least five battery cells, for instance at least six battery cells.

In the context of a further, alternative or additional embodiment, the battery system furthermore encompasses at least one temperature control conduit. The at least one temperature control conduit can be embodied, for example, in the form of a conduit loop or a conduit tube, for instance a so-called cooling loop. The battery cells and the at least one temperature control conduit can in particular be at least partly potted with at least one potting compound. For example, the at least one temperature control conduit can be embedded in potting compound.

In the context of a configuration of this embodiment, at least one temperature control conduit is disposed alongside and/or below the battery cells. The at least one temperature control conduit alongside and/or below the battery cells can be at least partly potted with at least one potting compound or embedded in potting compound.

For instance, the at least one temperature control conduit can be disposed in the interior space of the battery system housing and/or in the at least one potting compound, for example in a potting-compound unit encompassing the battery cells. For example, the at least one temperature control conduit can be disposed between battery cells, in particular lateral surfaces of the battery cells, and a side wall of the battery system housing or a lateral outer surface of the potting-compound unit and/or between battery cells, in particular bottom surfaces of the battery cells, and the bottom of the battery system housing or a lower outer surface of the potting-compound unit.

In particular, the at least one temperature control conduit can be disposed, for example fastened, on an inner surface of at least one side wall and/or of a bottom of the battery system housing, or can be disposed on at least one lateral outer surface and/or lower outer surface of the potting-compound unit. For instance, at least two temperature control conduits can be disposed, for example fastened, on inner surfaces of, in particular mutually oppositely located, side walls of the battery system housing, or can be disposed on, in particular mutually oppositely located, lateral outer surfaces of the potting-compound unit. Alternatively or in addition thereto, a temperature control conduit can be disposed, for example fastened, on the inner surface of the bottom of the battery system housing, or can be disposed on the lower outer surface of the potting-compound unit.

For instance, the at least one temperature control conduit can be partly embedded into the material of the battery system housing, for example clamped therein or molded thereonto. For example, the at least one temperature control conduit can be embedded partly into the material of at least one side wall and/or of the bottom of the battery system housing, for example clamped therein or molded thereonto.

The at least one temperature control conduit can be connectable in particular via temperature control conduit connectors that are disposed, for example, outside the battery system housing and/or the at least one potting compound, for example outside the potting-compound unit.

For instance, the at least one temperature control conduit can be passed through a side wall of the battery system housing or of the potting-compound unit. For instance, at least two temperature control conduits can be passed through, for example mutually oppositely located, side walls of the battery system housing or of the potting-compound unit.

In the context of a further, alternative or additional embodiment, the battery system encompasses at least one temperature control plate. The battery cells and the at least one temperature control plate can in particular be at least partly potted with at least one potting compound.

For example, the battery system housing or an or the potting-compound unit encompassing the battery cells can be equipped with at least one temperature control plate. For example, the at least one temperature control plate can be disposed, optionally fastened, alongside and/or below the battery cells.

In the context of a configuration of this embodiment, at least one temperature control plate forms at least one side wall and/or the bottom of an or of the battery system housing or of an or of the potting-compound unit encompassing the battery cells. The battery cells and the at least one temperature control plate can in particular be at least partly potted with at least one potting compound.

The battery system housing can in particular be in two parts, for example at least three parts, for instance several parts.

The battery system housing can in particular be assembled or assemblable from a base element, for example in the form of a frame or a plate, and at least one temperature control plate delimiting the interior space of the battery system housing or of the potting mold, for example serving as a bottom and/or side wall of the battery system housing.

In the battery system, for example, the battery cells and the at least one mounting grid and/or the positioning ribs and/or positioning projections of the battery system housing, and/or the at least one temperature control conduit and/or the at least one temperature control plate, can be at least partly potted with at least one potting compound.

For instance, the battery cells can be disposed in the interior space of the battery system housing and/or in the at least one potting compound, for example in an or in the potting-compound unit encompassing the battery cells. For example, the interior space of the battery system can be at least partly, for example, in particular substantially completely, filled, in particular filled up, with at least one potting compound.

In the context of a further, alternative or additional embodiment, the at least one mounting grid and/or the positioning ribs and/or positioning projections of the battery system housing, and/or the battery system housing and/or the at least one temperature control conduit and/or the at least one temperature control plate, is/are embodied from plastic. It is thereby possible to economize on, in particular metallic, components and to reduce weight, and optionally to decrease disposal costs and, for example, to simplify recycling of the system and lower the costs therefor. For instance, the at least one mounting grid can encompass or be constituted from polybutylene terephthalate (PBT).

In the context of a further, alternative or additional embodiment, the battery cells are positioned, for example by way of the at least one mounting grid and/or by way of the positioning ribs and/or positioning projections of the battery system housing, with a spacing from one another with formation of at least one battery cell-spacing interstice, and/or with a spacing from an or from the battery system housing, for example with a spacing from a wall of the battery system housing, and/or with a spacing from an outer side of an or of the potting-compound unit encompassing the battery cells, with formation of at least one housing-spacing or potting-compound unit outer side-spacing interstice, and/or with a spacing from a temperature control apparatus, in particular from an or from the temperature control conduit and/or temperature control plate, with formation of at least one temperature control apparatus-spacing interstice. In particular, the at least one battery cell-spacing interstice and/or the at least one housing-spacing or potting-compound unit outer side-spacing interstice and/or the at least one temperature control apparatus-spacing interstice can be filled with at least one potting compound.

In the context of a further, alternative or additional embodiment, the at least one mounting grid has grid openings into each of which a battery cell is respectively received, in particular inserted. The battery cells can each be surrounded peripherally by grid opening-forming grid bars of the at least one mounting grid. At least one of the grid opening-forming grid bars can have at least one potting compound inlet opening.

In the context of a further, alternative or additional embodiment, the battery system has an upper mounting grid for positioning battery cells and/or a lower mounting grid for positioning battery cells. In particular, the battery system can have an upper mounting grid for positioning battery cells and a lower mounting grid for positioning battery cells. For example, the grid openings of the upper mounting grid can be configured in such a way that the terminals of the battery cells, and in particular also the safety valves of the battery cells, are exposed therein. Optionally, the top surfaces of the battery cells can also be substantially exposed in the grid openings of the upper mounting grid.

The at least one mounting grid can in particular be in one piece. For example, the upper mounting grid can be in one piece and/or the lower mounting grid can be in one piece and/or the upper and lower mounting grids can be in one piece.

For example, the at least one mounting grid, for example the upper mounting grid and/or the lower mounting grid, can have, in particular vertical and/or lateral, stop portions that serve as a stop for the battery cells and, in particular, also for spacing adjacent battery cells apart and/or for spacing the battery cells away from an or from the battery system housing, in particular from the bottom and/or from at least one side wall of the battery system housing, or from an, in particular lower and/or lateral, outer side of an or of the potting-compound unit encompassing the battery cells, and/or for spacing the battery cells away from a temperature control apparatus, in particular from an or from the at least one temperature control conduit and/or temperature control plate.

For instance, vertical stop portions of the upper mounting grid can serve as an upper stop for the battery cells, in particular for the top surfaces of the battery cells, and/or lateral stop portions of the upper mounting grid can serve as a lateral stop for the battery cells, in particular for lateral surfaces of the battery cells, and/or vertical stop portions of the lower mounting grid can serve as a lower stop for the battery cells, in particular for the bottom surfaces of the battery cells, and/or lateral stop portions of the lower mounting grid can serve as a lateral stop for the battery cells, in particular for lateral surfaces of the battery cells. For example, the, in particular vertical and/or lateral, stop portions of the upper and/or lower mounting grid can be configured in such a way that they cover at most edge portions, for example, of the top surfaces and/or of the lateral surfaces and/or of the bottom surfaces, of the battery cells. For instance, the, in particular vertical and/or lateral, stop portions of the upper and/or lower mounting grid can be embodied in the form of tabs, which for example extend, proceeding from a grid opening-forming grid bar, laterally, for instance over a grid opening, or vertically, and/or in the form of corner plateaus, which for example extend over a corner portion between a corner constituted by two grid opening-forming grid bars, and/or in the form of frames, which in particular extend, proceeding from grid opening-forming grid bars, in particular peripherally, laterally, for example over the grid opening, and/or vertically, in particular peripherally around the battery cells, and/or in the form of transverse bars, which for example extend between two grid opening-forming grid bars and/or delimit grid openings, for example of the lower mounting grid, at the bottom.

The, for example lateral and/or vertical, in particular lateral, stop portions of the upper and/or lower mounting grid can furthermore serve to space adjacent battery cells apart and/or to space the battery cells away from an or from the battery system housing, in particular from the bottom and/or from at least one side wall of the battery system housing, or from an, in particular lower or lateral, outer side of an or of the potting-compound unit encompassing the battery cells and/or to space the battery cells away from a temperature control apparatus, in particular from an or from the at least one temperature control conduit and/or temperature control plate.

In addition, the upper and/or lower mounting grid can optionally have spacer portions for spacing adjacent battery cells apart, for example in the form of bars that, for instance, extend vertically proceeding from a grid opening-forming grid bar, in particular proceeding from a corner or from a T-shaped piece between several grid opening-forming grid bars. Contact between the battery cells, for example under vacuum potting conditions, can thereby advantageously be avoided.

Alternatively or additionally, the upper and/or lower mounting grid can optionally have spacer portions for spacing the battery cells away from an or from the battery system housing, in particular from the bottom and/or from at least one side wall, or from an, in particular lower or lateral, outer side of an or of the potting-compound unit encompassing the battery cells, for instance in the form of projections, and/or for spacing the battery cells away from a temperature control apparatus, in particular from an or from the at least one temperature control conduit and/or temperature control plate, for instance in the form of projections.

The positioning ribs and/or positioning projections can serve, for example, (likewise) as, in particular lateral and/or vertical, stops for the battery cells and in particular also for spacing adjacent battery cells apart and/or for spacing the battery cells away from the battery system housing, in particular from the bottom and/or from at least one side wall of the battery housing, and/or for spacing the battery cells away from a temperature control apparatus, in particular from an or from the at least one temperature control conduit and/or temperature control plate. The positioning ribs and/or positioning projections for spacing adjacent battery cells apart, and/or the positioning ribs and/or positioning projections for spacing the battery cells away from the battery system housing, and/or the positioning ribs and/or positioning projections for spacing the battery cells away from a temperature control apparatus, in particular from an or from the at least one temperature control conduit and/or temperature control plate, for example from at least one side wall of the battery system housing, can extend, in particular proceeding from a populating opening of the battery system housing, in a populating direction, for example vertically. Alternatively or in addition thereto, the positioning ribs and/or positioning projections for spacing adjacent battery cells apart, and/or the positioning ribs and/or positioning projections for spacing the battery cells away from the battery system housing, and/or the positioning ribs and/or positioning projections for spacing the battery cells away from a temperature control apparatus, in particular from an or from the at least one temperature control conduit and/or temperature control plate, for example from at least one side wall of the battery system housing, can extend, for example, in particular proceeding from a surface of the battery system housing, at least into the interior space of the battery system housing. In particular, the positioning ribs and/or positioning projections for spacing adjacent battery cells away from at least one side wall of the battery system housing can extend, in particular proceeding from a populating opening of the battery system housing, in a populating direction, for example vertically. The positioning ribs and/or positioning projections for spacing the battery cells away from a temperature control apparatus, in particular from an or from the at least one temperature control conduit and/or temperature control plate, in particular can extend, in particular proceeding from a surface to be populated with the temperature control apparatus, at least into the interior space of the battery system housing.

The at least one potting compound can be, in particular, electrically insulating and, optionally, thermally conductive. The at least one potting compound can be curable in particular at a temperature 60° C., for example in a temperature range between room temperature and 60° C.

The at least one potting compound can, for instance, encompass a reactive resin system according to the present invention or can be a potting compound according to the present invention.

In the context of a further, alternative or additional embodiment (double potting, two-phase potting), the at least one temperature control apparatus-spacing interstice is filled with a first potting compound, and the at least one battery cell-spacing interstice and/or the at least one housing-spacing or potting-compound unit outer side-spacing interstice is filled with a second potting compound.

In particular, the first potting compound can be thermally conductive and electrically insulating. The second potting compound can be, in particular, electrically insulating.

In particular, the first potting compound can have a higher thermal conductivity than the second potting compound, and/or the second potting compound can have a higher electrical resistance than the first potting compound, and/or the second potting compound can have a lower, in particular plastic, yield point and/or viscosity than the first potting compound.

In the context of a configuration of this embodiment, the first and second potting compounds are potted wet-in-wet.

For example, the first potting compound can encompass a reactive resin system according to the present invention or can be a potting compound according to the present invention, which system or compound is filled, in particular highly filled, with at least one thermally conductive filler. The second potting compound can be in particular an electrically insulating potting compound, for example a modified, filled epoxy potting compound, for instance a potting compound according to the present invention, in particular having good electrical insulation capability.

In the context of a further, alternative embodiment (single potting), a preform is disposed in the at least one temperature control apparatus-spacing interstice, and the at least one battery cell-spacing interstice and/or the at least one housing-spacing or potting-compound unit outer side-spacing interstice is filled with a potting compound. The preform can be, for example, a mat or a pad, in particular an elastomer mat or an elastomer pad, for example a so-called GapPad, made for instance of a thermal interface material (TIM), in particular for thermal contacting of the battery cells. For example, the preform can have a higher thermal conductivity than the potting compound, and/or the potting compound can have a higher electrical resistance than the preform, and/or the preform can have a lower coefficient of friction than the potting compound, and/or the potting compound can have a lower yield point and/or viscosity than the preform.

In the context of a further, alternative or additional embodiment (single potting), the at least one temperature control apparatus-spacing interstice, the at least one battery cell-spacing interstice, and the at least one housing-spacing or potting-compound unit outer side-spacing interstice are filled with a potting compound.

In particular in the case of single potting, the at least one potting compound can be, for example, a modified, filled epoxy potting compound, in particular having good electrical insulation capability.

Thermally conductive layers and/or films made of a thermal interface material (TIM) optionally can additionally be introduced, for example applied, on the bottom and/or on the side walls of the battery system housing.

The battery system can, for example, be used in, or configured for, an electric vehicle or hybrid electric vehicle.

With regard to further technical features and advantages of the battery system according to the present invention, reference is herewith explicitly made to the explanations in conjunction with the method according to the present invention and with the reactive resin system according to the present invention or the potting compound according to the present invention, and to the Figures and the description of the Figures.

The invention furthermore relates to a reactive resin system or a potting compound that encompasses at least one epoxy resin based on bisphenol A and/or bisphenol F as well as a bisphenol-A and/or -F epoxy-based, in particular bisphenol-A epoxy-based, formulation having silicone elastomer particles, and at least one amine hardener. In the formulation, epoxy units can in particular be chemically, for example covalently, bonded to silicone units which in particular form the silicone elastomer particles. For instance, epoxy units can be chemically bonded to the silicone elastomer particles, for example grafted thereonto, or polymer sequences having nonpolar silicone units can agglomerate into a silicone elastomer particle, in which context polymer sequences having polar epoxy units protrude outward. The formulation can therefore in particular encompass, or be constituted from, elastic particles or silicone elastomer particles whose interior is constituted by silicone units and whose exterior is constituted by epoxy units.

By way of the at least one amine hardener, curing of the reactive resin system at a temperature 60° C., for instance at room temperature, can advantageously be achieved. The thermal load on the battery cells can thus advantageously be limited to 60° C. Thanks to the silicone elastomer particles, in particular the silicone units, in the interior of the particles, the modulus of elasticity can advantageously be reduced. This in turn has the advantage that the potting compound can absorb even large tensile and compressive forces or large deformation forces on the battery cells, for example in the context of charge/discharge processes in the battery cells, in particular over the entire service life. In addition, by way of the silicone elastomer particles, in particular the silicone units in the interior of the particles, fracture toughness can advantageously be enhanced (toughness modification) and, for example progressive, cracking can be avoided. The result is also in turn that, advantageously, abrasion resistance can be improved. As a result of the, in particular chemically bonded, epoxy units, which in particular constitute the exterior of the particles, the particles in addition can behave chemically like an epoxy, for example in an epoxy resin matrix.

In the context of an embodiment, the at least one amine hardener encompasses or is at least one polyamine and/or at least one polyamidoamine. For instance, the at least one amine hardener can encompass or be tetraethylenepentamine and/or triethylenetetramine. These amine hardeners have proven to be particularly advantageous.

The formulation, or the silicone elastomer particles, can be or become used, for example, in the form of a dispersion of resin and silicone elastomer particles, for example crosslinked polyorganosiloxane particles. For example, the formulation can be or become used in the form of a dispersion that contains the at least one epoxy resin based on bisphenol A and/or bisphenol F, in particular bisphenol A, and, in particular liquid or solid, silicone elastomer particles. The silicone contained in the dispersion can be, for example, crosslinked into a rubber-elastic polymer.

In the context of a further embodiment, the reactive resin system or the potting compound furthermore encompasses at least one, in particular thermally conductive, filler. Heat dissipation can thereby advantageously be improved, and/or the coefficient of expansion reduced. For instance, the at least one, in particular thermally conductive, filler can encompass or be aluminum hydroxide and/or aluminum oxide and/or silicon dioxide, in particular quartz, and/or boron nitride and/or chalk and/or microdolomite and/or talc and/or aluminum silicate and/or magnesium oxide and/or wollastonite and/or magnesium carbonate and/or mica. In particular, the at least one, in particular thermally conductive, filler can encompass or be aluminum hydroxide and/or aluminum oxide and/or silicon dioxide, in particular quartz, and/or boron nitride.

For example, the at least one, in particular thermally conductive, filler can have a particle distribution in a range from $\geq 2$ µm to $\leq 1$ mm.

In the context of a further embodiment, the reactive resin system or the potting compound encompasses, based on the total weight of the reactive resin system or of the potting compound, $\geq 9$ wt % to $\leq 77$ wt %, for example $\geq 9.3$ wt % to $\leq 76.5$ wt %, of the at least one epoxy resin based on bisphenol A and/or bisphenol F. For instance, the reactive resin system or the potting compound can encompass, based on the total weight of the reactive resin system or of the potting compound, $\geq 9$ wt % to $\leq 30$ wt % of the at least one epoxy resin based on bisphenol A and/or bisphenol F.

In the context of a further embodiment, the reactive resin system or the potting compound encompasses, based on the total weight of the reactive resin system or of the potting compound, $\geq 4$ wt % to $\leq 40$ wt %, for example $\geq 4.2$ wt % to $\leq 36.5$ wt %, of the at least one amine hardener. For instance, the reactive resin system or the potting compound can encompass, based on the total weight of the reactive resin system or of the potting compound, $\geq 4$ wt % to $\leq 12$ wt % of the at least one amine hardener.

In the context of a further embodiment, the reactive resin system or the potting compound encompasses, based on the total weight of the reactive resin system or of the potting compound, $\geq 0.1$ wt % to $\leq 35$ wt %, for example $\geq 0.2$ wt % to $\leq 34.6$ wt %, of the bisphenol A- and/or -F epoxy-based, in particular bisphenol-A epoxy-based, formulation having silicone elastomer particles. This has proven to be advantageous. With a higher proportion, brittleness but also breakage stress can decrease, but the coefficient of thermal expansion can increase. For instance, the reactive resin system or the potting compound can encompass, based on the total weight of the reactive resin system or of the potting compound, ≥3 wt % to ≤15 wt %, for example 924 5 wt % to ≤15 wt %, of the bisphenol A- and/or -F epoxy-based, in particular bisphenol-A epoxy-based, formulation having silicone elastomer particles.

In the context of a further embodiment, the reactive resin system or the potting compound encompasses, based on the total weight of the reactive resin system or the potting compound, ≥0 wt % to ≤85 wt % of the at least one, in particular thermally conductive, filler. For instance, the reactive resin system or the potting compound can encompass, based on the total weight of the reactive resin system or of the potting compound, ≥50 wt % to ≤85 wt % of the at least one, in particular thermally conductive, filler. It is thereby advantageously possible to achieve high thermal conductivity, for example ≥0.6 W/(m·K), in particular ≥0.8 W/(m·K), for instance ≥1.5 W/(m·K), or even ≥1.8 W/(m·K).

In the context of a further embodiment, the reactive resin system or the potting compound encompasses at least one additive. For instance, the reactive resin system or the potting compound can furthermore encompass, based on the total weight of the reactive resin system or of the potting compound, ≥0 wt % to ≤1 wt %, for example ≥0.2 wt % to ≤0.7 wt %, of the at least one additive.

Some exemplifying compositions for the reactive resin system or potting compound are reproduced in Table 1.

TABLE 1

Examples of compositions of the reactive resin system or potting compound, in wt %

| | 1 | 2 | 3 | 4 | 5 | 6 | 7 | 8 |
|---|---|---|---|---|---|---|---|---|
| Epoxy resin based on bisphenol A and/or F | 76.5 | 63 | 52 | 45.6 | 15.2 | 9.3 | 20.5 | 15.8 |
| Amine hardener | 21.5 | 36 | 13 | 23.5 | 4.2 | 5.3 | 5.1 | 8.2 |
| Silicone | 1.5 | 0.5 | 34.6 | 30.5 | 0.3 | 0.2 | 13.7 | 10.5 |
| Fillers | 0 | 0 | 0 | 0 | 80 | 85 | 60 | 65 |
| Additives | 0.5 | 0.5 | 0.4 | 0.4 | 0.3 | 0.2 | 0.7 | 0.5 |

Some special exemplifying compositions for the reactive resin system or potting compound, and their properties, are reproduced in Table 2.

TABLE 2

Examples of compositions of the reactive resin system or potting compound, in wt %, and properties thereof.

| | 9 | 10 | 11 | 12 |
|---|---|---|---|---|
| Bisphenol-A/-F epoxy resin | 22 | 21.55 | 26.3 | 11.7 |
| Tetraethylenepentamine | 11.5 | 11.8 | 5.68 | 6 |
| Silicone | 11 | 7.7 | 13.2 | 5.9 |
| Al(OH)$_3$ | 55 | 58.5 | 9.87 | 29.3 |
| BN | — | — | 44.4 | — |
| SiO$_2$ | — | — | — | 46.8 |
| Additive | 0.5 | 0.45 | 0.55 | 0.3 |
| Properties | | | | |
| Glass transition temperature Tg (° C.) | 45 | 40 | | 45 |
| Coeff. of thermal expansion <Tg (10$^{-6}$ 1/° C.) | 62 | 54 | | 27 |
| Thermal conductivity (W/m · K) | 0.67 | 0.82 | 1.5 | 1.85 |

The following starting materials were used:

| | |
|---|---|
| Epilox A19-00, Leuna | Bisphenol-A epoxy resin |
| Epilox F16-01, Leuna | Bisphenol-F epoxy resin |
| Albidur EP 2240A, Evonik | Silicone modifier as emulsion, bisphenol-A epoxy-based formulation with silicone elastomer particles (40 wt % silicone content) |
| HY 842, Huntsman | Amine hardener: tetraethylenepentamine |
| HY 956, Huntsman | Amine hardener: triethylenetetramine |
| H31, Quarzwerke | Sand (SiO$_2$), particle size <0.1 mm-0.5 mm |
| Apyral 2 E, Nabaltec | Aluminum hydroxide Al(OH)$_3$ |
| Additives: | |
| DF100, Evonik | Silicone-based defoamer |
| W980, BYK | Wetting and dispersion additive: solution of a salt of unsaturated polyaminoamides and acid polyesters |
| W9010, BYK | Copolymer having acid groups |

In the context of a special embodiment, the reactive resin system or the potting compound encompasses, based on the total weight of the reactive resin system or of the potting compound, ≥9 wt % to ≤30 wt % of the at least one epoxy resin based on bisphenol A and/or bisphenol F, ≥4 wt % to ≤12 wt % of the at least one amine hardener, ≥3 wt % to ≤15 wt %, for example ≥5 wt % to ≤15 wt %, of the bisphenol-A and/or bisphenol-F epoxy-based, in particular bisphenol-A epoxy-based, formulation having silicone elastomer particles, and ≥50 wt % to ≤85 wt % of the at least one, in particular thermally conductive, filler. For instance, the reactive resin system or the potting compound can furthermore encompass, based on the total weight of the reactive resin system or of the potting compound, ≥0 wt % to ≤1 wt %, for example ≥0.2 wt % to ≤0.7 wt %, of the at least one additive.

With regard to further technical features and advantages of the reactive resin system according to the present invention or of the potting compound according to the present invention, reference is herewith explicitly made to the explanations in conjunction with the method according to the present invention and the battery system according to the present invention, and to the Figures and the description of the Figures.

Further advantages and advantageous embodiments of the subjects of the present invention are illustrated by the drawings and explained in the description that follows. Be it noted in this context that the drawings are merely descriptive in nature and are not intended to limit the invention in any way.

BRIEF DESCRIPTION OF THE DRAWINGS

FIGS. 1 to 7 are schematic cross sections to illustrate several embodiments of a battery system and/or manufacturing method according to the present invention in which battery cells are positioned by way of an upper and lower mounting grid and at least partly potted with a potting compound.

DETAILED DESCRIPTION

Figure 8:
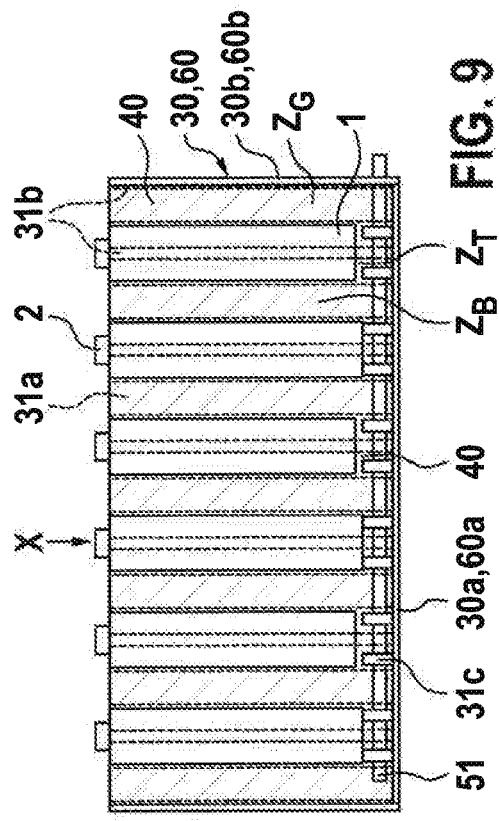
FIGS. 8 to 14 are schematic cross sections to illustrate several further embodiments of a battery system and/or manufacturing method according to the present invention in which battery cells are positioned by way of positioning ribs and/or positioning projections of a battery system housing or of a potting mold, and at least partly potted with a potting compound.

FIGS. 1 to 35 show embodiments of a battery system according to the present invention, or illustrate embodiments of a method according to the present invention. The battery systems shown can be, for example, lithium battery systems, for instance lithium-ion battery modules and/or lithium-ion battery packs. Battery cells 1 can be, for example, lithium cells, for instance lithium-ion cells. For instance, battery cells 1 can each have an, in particular solid or rigid, for example metallic, cell housing. For instance, the battery cells can be, in particular prismatic, housing cells, so-called "hard case" cells.

The embodiments shown in FIGS. 1 to 35b have in common the fact that battery cells 1 are or become at least partly potted with at least one potting compound 40; 41, 42. The at least one potting compound 40; 41, 42 can in particular be electrically insulating and, optionally, thermally conductive. Battery cells 1 are positioned in particular before potting with the at least one potting compound 40; 41, 42.

In the context of the embodiments shown in FIGS. 1 to 7, 22 to 30b, battery cells 1 are or become positioned by way of at least one mounting grid 10, 20 for positioning battery cells 1.

In the context of the embodiments shown in FIGS. 2 to 14, 31 to 33b, battery cells 1 are or become positioned by way of positioning ribs and/or positioning projections 31a, 31b, 31c of a battery system housing 30, which ribs and/or projections 31a, 31b, 31c are configured for positioning battery cells 1.

In the context of the embodiments shown in FIGS. 15 to 21, battery cells 1 have been positioned by way of a mounting gripper (not depicted) for positioning battery cells 1.

Figure 34:
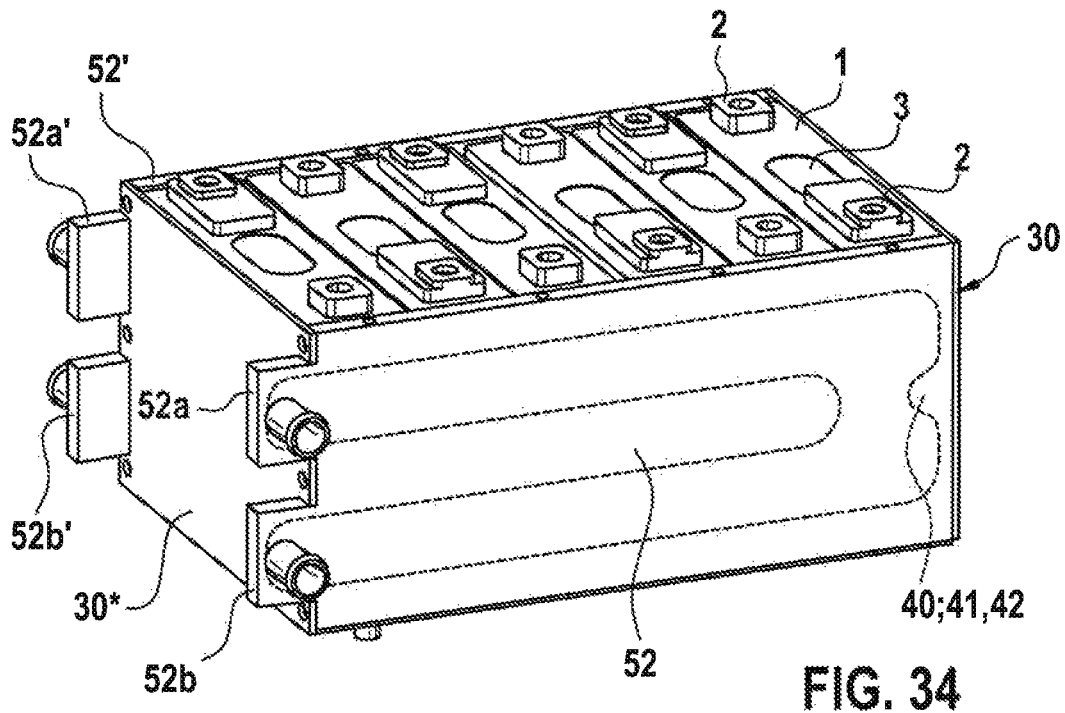
FIG. 34 is a schematic perspective view of a further embodiment of a battery system according to the present invention having a battery system housing made up of a base element and two temperature control plates premounted thereon on oppositely located sides and serving as side walls, in which battery cells and the temperature control plates are at least partly potted with at least one potting compound.
Figure 35A:
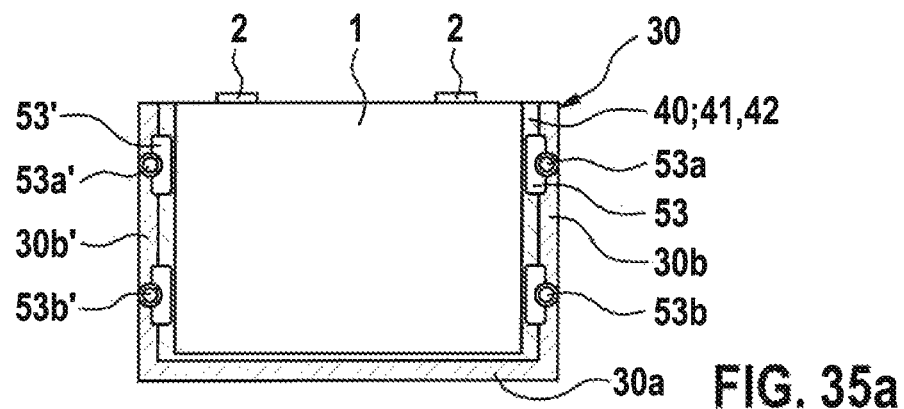
FIGS. 35a, 35b are schematic cross sections of a further embodiment of a battery system according to the present invention having a battery system housing having two temperature control agent conduits premounted thereon on inner surfaces of oppositely located side walls of the battery system housing, in which battery cells and the temperature control conduits are at least partly potted with at least one potting compound.
Figure 35B:
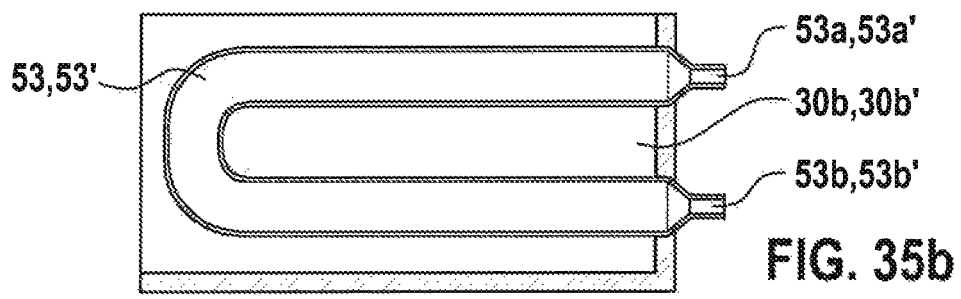

In the context of the embodiments shown in FIGS. 34 to 35b, battery cells 1 are or have been potted, together with temperature control plates 52, 52' or temperature control conduits 53, 53' disposed alongside battery cells 1, at least partly with at least one potting compound 40. The positioning of battery cells 1 can be accomplished, for example, by way of at least one mounting grid, positioning ribs and/or positioning projections, or a mounting gripper (not depicted).

Potting with the at least one potting compound 40; 41, 42 can be accomplished in the context of the embodiments shown in FIGS. 1 to 35b, for example, by the fact that battery cells 1 are firstly introduced into the interior space of a potting mold 60, for example a reusable mold or an expendable mold, for instance in the form of a potting pan, which is at least partly filled with the at least one potting compound 40; 41, 42. After curing of the at least one potting compound 40; 41, 42, battery cells 1, along with potting compound 40; 41, 42 and optionally further components, form a unit, in particular a potting-compound unit encompassing battery cells 1, which unit can be released again from potting mold 60. That potting-compound unit can then be inserted into a battery system housing 30. The unit can, however, optionally also be used without an additional battery system housing 30 and, for example, simply inserted into a mounting frame and/or fastened onto a mounting plate.

Potting with the at least one potting compound 40; 41, 42 can, however, also be accomplished in the context of the embodiments shown in FIGS. 1 to 35b, for example, by the fact that battery cells 1 are introduced directly into the interior space of a battery system housing 30 that is at least partly filled with the at least one potting compound 40; 41, 42. After curing of the at least one potting compound 40; 41, 42, battery cells 1 can then form a unit with battery system housing 30 and with potting compound 40; 41, 42.

FIGS. 1 to 7 are schematic cross sections through several embodiments of a battery system according to the present invention in which battery cells 1 are positioned by way of an upper mounting grid 10, for example an immobilizing grid, for positioning battery cells 1 and by way of a lower mounting grid 20, for example an immobilizing grid, for positioning battery cells 1, and are at least partly potted with at least one potting compound 40; 41, 42. Battery cells 1 are in that context disposed by way of upper 10 and lower mounting grid 20 with a spacing from one another with formation of battery cell-spacing interstices $Z_B$, and with a spacing from battery system housing 30 or potting mold 60 with formation of housing-spacing or potting mold-spacing interstices $Z_G$, and with a spacing from a temperature control apparatus, for example a temperature control conduit 51, 53, 53' or a temperature control plate 50, 52, 52', with formation of at least one temperature control apparatus-spacing interstice $Z_T$. Battery cells 1 and mounting grid 10, 20 are at least partly potted with at least one potting compound 40; 41, 42. FIGS. 1 to 7 show that battery cell-spacing interstices $Z_B$, housing-spacing or potting mold-spacing interstices $Z_G$, and temperature control apparatus-spacing interstices $Z_T$ are filled with at least one potting compound 40; 41, 42. FIGS. 1 to 7 show in particular that battery cells 1, and in particular also mounting grids 10, 20, are respectively disposed in the interior space of battery system housing 30 or of potting mold 60 which is filled, for example, in particular substantially completely, filled up, with the at least one potting compound 40; 41, 42.

FIG. 1 indicates that in the context of the embodiment shown therein, upper mounting grid 10 and lower mounting grid 20 each have grid openings 11, 21 into each of which a battery cell 1 is inserted. Battery cells 1 are in that context each surrounded peripherally by grid opening-forming grid bars 12, 22 of upper 10 or lower mounting grid 20. Grid openings 11 of upper mounting grid 10 are configured in such a way that terminals 2 of battery cells 1, and in particular also the safety valves (not depicted in FIGS. 1 to 7) of battery cells 1, are exposed therein, and in particular extend outward through grid openings 11 of upper mounting grid 10. Upper mounting grid 10 and lower mounting grid 20 each have vertical stop portions 13, 23 and lateral stop portions 14, 24 that serve as a stop for battery cells 1 and in particular also for spacing adjacent battery cells 1 apart and for spacing battery cells 1 away from battery system housing 30 or from potting mold 60 and for spacing battery cells 1 away from a temperature control apparatus 50. Vertical stop portions 13 of upper mounting grid 10 serve as an upper stop for battery cells 1, in particular for top surface D of battery cells 1, lateral stop portions 14 of upper mounting grid 10 serving as a lateral stop for battery cells 1, in particular for lateral surfaces S of battery cells 1. Vertical stop portions 23 of lower mounting grid 20 serve in particular as a lower stop for battery cells 1, in particular for bottom surface B of battery cells 1, lateral stop portions 24 of lower mounting grid 20 serving as a lateral stop for battery cells 1, in particular for lateral surfaces S of battery cells 1. The vertical and lateral stop portions 13, 14, 23, 24 of upper 10 and lower mounting grid 20 are configured in such a way that said portions 13, 14, 23, 24 cover only edge portions, for example top surfaces D or lateral surfaces S or bottom surfaces B, of battery cells 1.

FIG. 1 shows that in the context of the embodiment shown therein, only one potting compound 40 is used (single potting), battery cells 1 and mounting grids 10, 20 being potted with potting compound 40. Battery cell-spacing interstices $Z_B$, housing-spacing or potting compound-spacing interstices $Z_G$, and temperature control apparatus-spacing interstice $Z_T$ are filled with potting compound 40. In particular, the interior space of battery system housing 30 or of potting mold 60 is filled, for example, in particular substantially completely, filled up, with potting compound 40.

FIG. 1 shows that in the context of the embodiment shown therein, a temperature control plate 50, for instance a flat cooling plate, forms the bottom of battery system housing 30 or of potting mold 60 that will later be removed again, for example an expendable mold. For example, battery system housing 30 or potting mold 60 can be in at least two parts. Battery system housing 30 or potting mold 60 is assemblable or assembled from a base element 30*, 60*, for example in the form of a frame, and a temperature control plate 50, for instance a coolable bottom plate, delimiting the interior space of battery system housing 30 or of potting mold 60 and serving as a bottom of battery system housing 30 or of potting mold 60. Temperature control plate 50 that forms the bottom, like battery cells 1 and mounting grids 10, 20, is at least partly potted with potting compound 40.

The embodiment shown in FIG. 2 differs from the embodiment shown in FIG. 1 substantially in that—in particular instead of temperature control plate 50 that forms the bottom—a temperature control conduit 51, in particular in the form of a conduit loop or a conduit tube, for instance a cooling loop, is disposed below battery cells 1. Temperature control conduit 51 is disposed in particular between battery cells 1, in particular bottom surfaces B of battery cells 1, and bottom 30a, 60a of battery system 30 or of potting mold 60. Temperature control conduit 51, like battery cells 1 and mounting grids 10, 20, is at least partly potted with potting compound 40. In particular, temperature control conduit 51 is potted in potting compound 40 below battery cells 1. FIG. 2 shows that temperature control conduit 51 is connectable via temperature control connectors 51a, b outside battery system housing 30 or outside potting compound 40. In particular, temperature control conduit 51 is passed through a side wall 30b, 60b of battery system housing 30 or of potting mold 60.

The embodiment shown in FIG. 3 differs from the embodiment shown in FIG. 1 substantially in that battery system housing 30 or potting mold 60 has—in particular instead of temperature control plate 50 that forms the bottom—two temperature control plates 52, 52', for instance two flat cooling plates, that form, in particular mutually oppositely located, side walls of battery system housing 30 or of potting mold, for instance in the form of an expendable mold. For example, battery system housing 30 or potting mold 60 can be in at least three parts. Battery system housing 30 or potting mold 60 is assemblable or assembled from a base element 30*, 60*, for example in the form of a plate, and two temperature control plates 52, 52' delimiting the interior space of battery system housing 30 or of potting mold 60 and serving as side walls, for instance coolable side walls, of battery system housing 30 or of potting mold 60. Temperature control apparatus plates 52, 52' that form the side walls, like battery cells 1 and mounting grids 10, 20, are at least partly potted with potting compound 40.

The embodiment shown in FIG. 4 differs from the embodiment shown in FIG. 1 substantially in that—in particular instead of temperature control plate 50 that forms the bottom—two temperature control conduits 53, 53', in particular in the form of conduit loops or conduit tubes, for instance cooling loops, are disposed alongside battery cells 1. Temperature control conduits 53, 53' are respectively disposed between battery cells 1, in particular lateral surfaces S of battery cells 1, and, in particular mutually oppositely located, side walls 30b, 30b', 60, 60b' of battery system housing 30 or of potting mold 60. Temperature control conduits 53, 53', like battery cells 1 and mounting grids 10, 20, are at least partly potted with potting compound 40. In particular, temperature control conduits 53, 53' are respectively potted in potting compound 40 alongside, in particular on mutually oppositely located sides of, battery cells 1. FIG. 4 shows that temperature control conduits 53, 53' are connectable via temperature control connectors 53a, b, 53a', b' outside battery system housing 30 or outside potting mold 60. In particular, temperature control conduits 53, 53' are passed through, in particular mutually oppositely located, side walls 30b, 30b', 60b, 60b' of battery system housing 30 or of potting mold 60.

The embodiment shown in FIG. 5 differs from the embodiment shown in FIG. 1 substantially in that a preform 70, for example a mat or a pad, for instance an elastomer mat or an elastomer pad, for example a so-called GapPad, for example made of a thermal interface material (TIM), is disposed in temperature control apparatus-spacing interstice $Z_T$, in particular for thermal contacting of battery cells 1. The at least one battery cell-spacing interstice $Z_B$ and the at least one housing-spacing interstice $Z_G$, however, are again filled with only one potting compound 40 (single potting). The interior space of battery system housing 30 or of potting mold 60 is, in particular substantially completely, filled up with potting compound 40. Preform 70 can in particular have a higher thermal conductivity than potting compound 40, and/or potting compound 40 can have a higher electrical resistance than preform 70.

The embodiment shown in FIG. 6 differs from the embodiment shown in FIG. 1 substantially in that—in particular instead of one potting compound 40 (single potting)—a first potting compound 41 and a second potting compound 42 are used (double potting, two-phase potting), temperature control apparatus plate 50 that forms a bottom, and lower mounting grid 20, and bottom surfaces B of battery cells 1 being potted with first potting compound 41, and the remaining battery cells 1, in particular substantially, together with upper mounting grid 10, being potted with second potting compound 42. Temperature control apparatus-spacing interstice $Z_T$ is filled with first potting compound 41, battery cell-spacing interstices $Z_B$ as well as housing-spacing or potting mold-spacing interstices $Z_G$ being substantially filled with second potting compound 42. The interior space of battery system housing 30 or of potting mold 60 is, in particular substantially completely, filled up with second potting compound 42. First potting compound 41 and second potting compound 42 can be potted, in particular, wet-in-wet. First potting compound 41 can in particular be thermally conductive and electrically insulating. For example, first potting compound 41 can have a higher thermal conductivity than second potting compound 42, and/or second potting compound 42 can have a higher electrical resistance than first potting compound 41.

The embodiment shown in FIG. 7 differs from the embodiment shown in FIG. 2 substantially in that—in particular instead of one potting compound 40 (single potting)—a first potting compound 41 and a second potting compound 42 are used (double potting, two-phase potting), temperature control conduit 51 and lower mounting grid 20, as well as bottom surfaces B of battery cells 1, being potted with first potting compound 41, and the remaining battery cells 1, in particular substantially, together with upper mounting grid 10, being potted with second potting compound 42. In particular, temperature control conduit 51 is potted into first potting compound 41 below battery cells 1. Analogously to the embodiment shown in FIG. 6, temperature control apparatus-spacing interstice $Z_T$ is filled with first potting compound 41, battery cell-spacing interstices $Z_B$ as well as housing-spacing or potting mold-spacing interstices $Z_G$ being substantially filled with second potting compound 42. The interior space of battery system housing 30 or of potting mold 60 is, in particular substantially completely, filled up with second potting compound 42. First potting compound 41 and second potting compound 42 can be potted, in particular, wet-in-wet. First potting compound 41 can in particular be thermally conductive and electrically insulating. For example, first potting compound 41 can have a higher thermal conductivity than second potting compound 42, and/or second potting compound 42 can have a higher electrical resistance than first potting compound 41.

FIGS. 8 to 14 are schematic cross sections through several embodiments of a battery system according to the present invention in which battery cells 1 are positioned by way of positioning ribs and/or positioning projections 31a, 31b, 31c of battery system housing 30 or of potting mold 60 which are configured for positioning battery cells 1, and are at least partly potted with at least one potting compound 40; 41, 42. Battery cells 1 are in that context disposed by way of positioning ribs and/or positioning projections 31a, 31b, 31c with a spacing from one another with formation of battery cell-spacing interstices $Z_B$, and with a spacing from battery system housing 30 or potting mold 60 with formation of housing-spacing or potting mold-spacing interstices $Z_G$, and with a spacing from a temperature control apparatus, for example a temperature control conduit 51, 53, 53' or a temperature control plate 50, 52, 52', with formation of at least one temperature control apparatus-spacing interstice $Z_T$. Battery cells 1 and positioning ribs and/or positioning projections 31a, 31b, 31c are at least partly potted with at least one potting compound 40; 41, 42. FIGS. 8 to 14 show that battery cell-spacing interstices $Z_B$, housing-spacing or potting mold-spacing interstices $Z_B$, and temperature control apparatus-spacing interstices $Z_T$ are filled with at least one potting compound 40; 41, 42. FIGS. 8 to 14 show in particular that battery cells 1 and positioning ribs and/or positioning projections 31a, 31b, 31c are disposed respectively in an interior space of a battery system housing 30 or of a potting mold 60 which is filled, for example, in particular substantially completely, filled up, with at least one potting compound 40; 41, 42.

FIGS. 8 to 14 furthermore indicate that positioning ribs and/or positioning projections 31a, 31b, 31c serve as, in particular lateral and/or vertical, stops for battery cells 1 and in particular also for spacing adjacent battery cells 1 apart and/or for spacing battery cells 1 away from battery system housing 30 or from potting mold 60, in particular from the bottom and/or from at least one side wall of battery system housing 30 or of potting mold 60, and/or for spacing battery cells 1 away from a temperature control apparatus, in particular from at least one temperature control conduit and/or temperature control plate 50, 51, 52, 53.

FIGS. 8 to 14 show that positioning ribs and/or positioning projections 31a for spacing adjacent battery cells 1 apart, and/or positioning ribs and/or positioning projections 31b for spacing battery cells 1 away from battery system housing 30 or from potting mold 60, and/or positioning ribs and/or positioning projections 31c for spacing battery cells 1 away from the temperature control apparatus, in particular from the at least one temperature control conduit and/or temperature control plate 50, 51, 52, 53, can extend, for example proceeding from a populating opening of battery system housing 30 or of potting mold 60, in a populating direction X, for example vertically. Positioning ribs and/or positioning projections 31c for spacing battery cells 1 away from the temperature control apparatus, in particular from the at least one temperature control conduit and/or temperature control plate 50, 51, 52, 53, can extend in particular, proceeding from a surface to be populated with the temperature control apparatus 50, 51, 52, 53, at least into the interior space of battery system housing 30 or of potting mold 60.

The embodiment shown in FIG. 8 differs from the embodiment depicted in FIG. 1 substantially in that battery cells 1 are positioned—in particular instead of by way of mounting grids 10, 20—by way of positioning ribs and/or positioning projections 31a, 31b, 31c of battery system housing 30 or of potting mold 60. Positioning ribs 31a for spacing adjacent battery cells 1 apart and positioning ribs 31b for spacing battery cells 1 away from battery system housing 30 or potting mold 60 can in particular be configured on base element 30*, 60*, for example in the form of a frame, of battery system housing 30 or of potting mold 60. Positioning ribs and/or positioning projections 31c for spacing battery cells 1 away from temperature control apparatus 50 can be configured on temperature control plate 50 that delimits the interior space of battery system housing 30 or of potting mold 60 and serves as a bottom of battery system housing 30 or of potting mold 60, for example on a coolable bottom plate, and/or likewise on base element 30*, 60* of battery system housing 30 or of potting mold 60.

Figure 9:
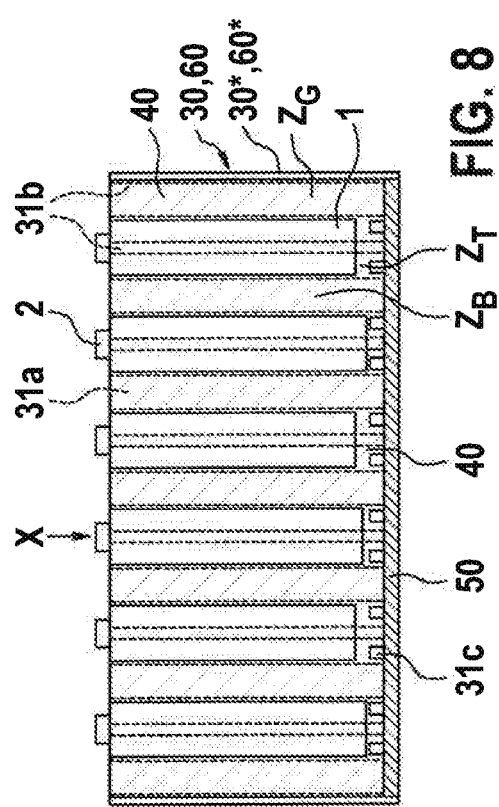

The embodiment shown in FIG. 9 differs from the embodiment shown in FIG. 2 substantially in that battery cells 1 are positioned—in particular instead of by way of mounting grids 10, 20—by way of positioning ribs and/or positioning projections 31a, 31b, 31c of battery system housing 30 or of potting mold 60. Positioning ribs 31a for spacing adjacent battery cells 1 apart and positioning ribs 31b for spacing battery cells 1 away from battery system housing 30 or from potting mold 60 can be configured on side walls 30b, 60b of battery system housing 30 or of potting mold 60. Positioning ribs and/or positioning projections 31c for spacing battery cells 1 away from temperature control apparatus 51 can be configured on bottom 30a, 60a and/or likewise on side walls 30b, 60b of battery system housing 30 or of potting mold 60.

Figure 10:
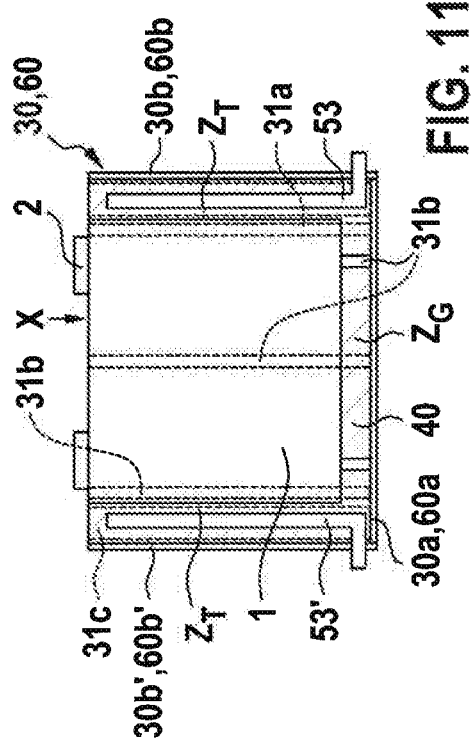

The embodiment shown in FIG. 10 differs from the embodiment shown in FIG. 3 substantially in that battery cells 1 are positioned—in particular instead of by way of mounting grids 10, 20—by way of positioning ribs and/or positioning projections 31a, 31b, 31c of battery system housing 30 or of potting mold 60. Positioning ribs 31a for spacing adjacent battery cells 1 apart and positioning ribs and/or positioning projections 31c for spacing battery cells 1 away from temperature control apparatus 53, 53' can be configured in particular on temperature control plates 52, 52' that form the, in particular mutually oppositely located, side walls of battery system housing 30 or of potting mold 60. Positioning ribs 31b for spacing battery cells 1 away from battery system housing 30 or from potting mold 60 can likewise be configured on temperature control plates 52, 52' that form the side walls, and/or on base element 30*, 60*, for example in the form of a plate, of battery system housing 30 or of potting mold 60.

Figure 11:
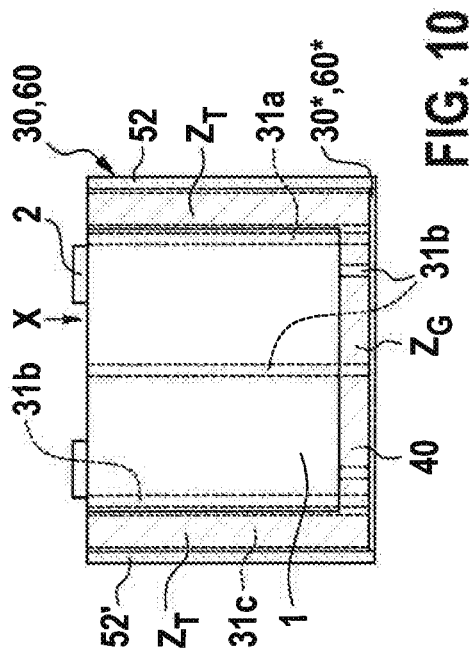

The embodiment shown in FIG. 11 differs from the embodiment shown in FIG. 4 substantially in that battery cells 1 are positioned—in particular instead of by way of mounting grids 10, 20—by way of positioning ribs and/or positioning projections 31a, 31b, 31c of battery system housing 30 or of potting mold 60. Positioning ribs 31a for spacing adjacent battery cells 1 apart and positioning ribs and/or positioning projections 31c for spacing battery cells 1 away from temperature control apparatus 53, 53' can be configured in particular on side walls 30b, 30b', 60b, 60b' of battery system housing 30 or of potting mold 60. Positioning ribs 31b for spacing battery cells 1 away from battery system housing 30 or from potting mold 60 can likewise be embodied on side walls 30b, 30b', 60b, 60b' and/or on bottom 30a, 60a of battery system housing 30 or of potting mold 60.

Figure 12:
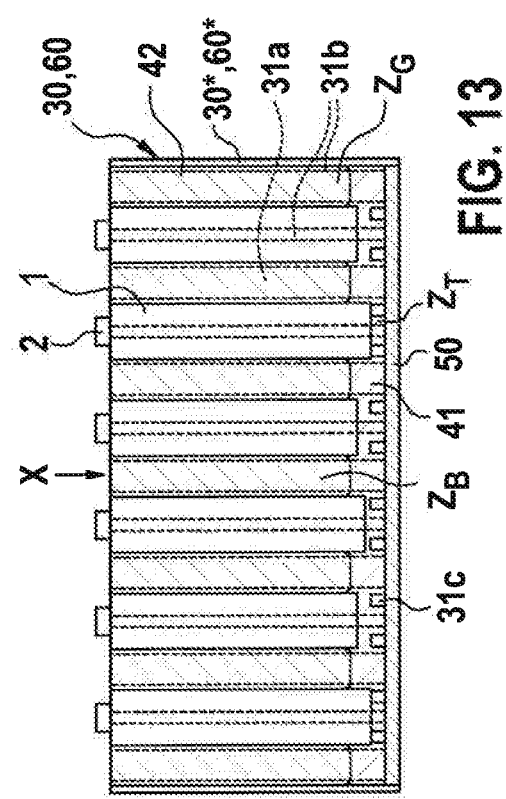

The embodiment shown in FIG. 12 differs from the embodiment shown in FIG. 5 substantially in that battery cells 1 are positioned—in particular instead of by way of mounting grids 10, 20—by way of positioning ribs and/or positioning projections 31a, 31b, 31c of battery system housing 30 or of potting mold 60. Positioning ribs 31a for spacing adjacent battery cells 1 apart and positioning ribs 31b for spacing battery cells 1 away from battery system housing 30 or from potting mold 60 can be embodied in particular on base element 30*, 60*, for example in the form of a frame, of battery system housing 30 or of potting mold 60. Positioning ribs and/or positioning projections 31c for spacing battery cells 1 away from temperature control apparatus 53, 53' can optionally be omitted, since preform 70 can at least partly take on their function.

Figure 13:
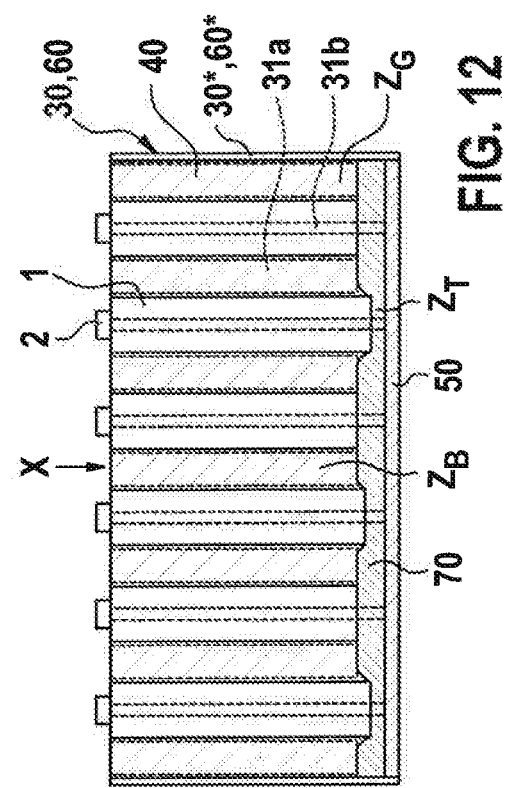

The embodiment shown in FIG. 13 differs from the embodiment shown in FIG. 8 substantially in that—in particular instead of one potting compound 40 (single potting)—a first potting compound 41 and a second potting compound 42 are used (double potting, two-phase potting), temperature control plate 50 that forms the bottom being potted with first potting compound 41, and battery cells 1 being potted with second potting compound 42. Temperature control apparatus-spacing interstice $Z_T$ is filled with first potting compound 41, battery cell-spacing interstices $Z_B$ as well as housing-spacing or potting mold-spacing interstices $Z_G$ being, in particular substantially, filled with second potting compound 42. The interior space of battery system housing 30 or of potting mold 60 is in that context, in particular substantially completely, filled up with second potting compound 42. First potting compound 41 and second potting compound 42 can be potted, in particular, wet-in-wet. First potting compound 41 can in particular be thermally conductive and electrically insulating. For example, first potting compound 41 can have a higher thermal conductivity than second potting compound 42, and/or second potting compound 42 can have a higher electrical resistance than first potting compound 41.

Figure 14:
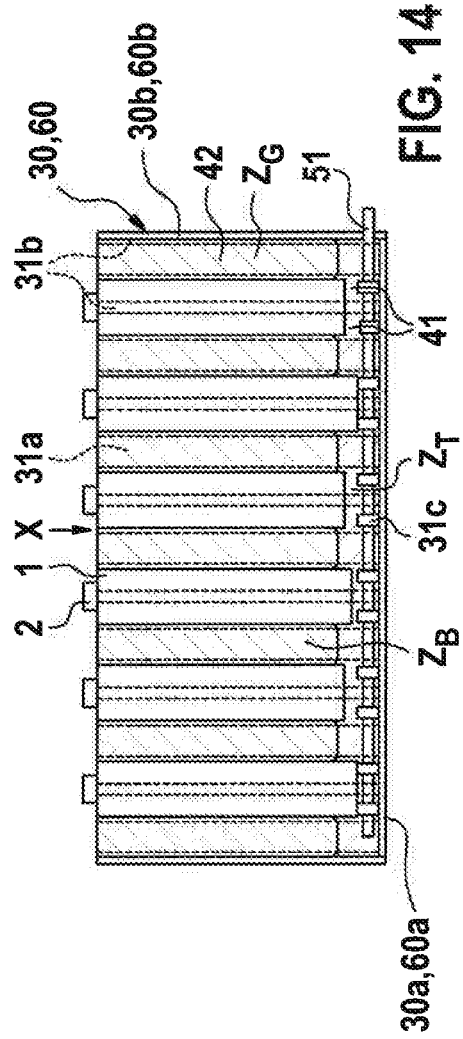
Figure 15:
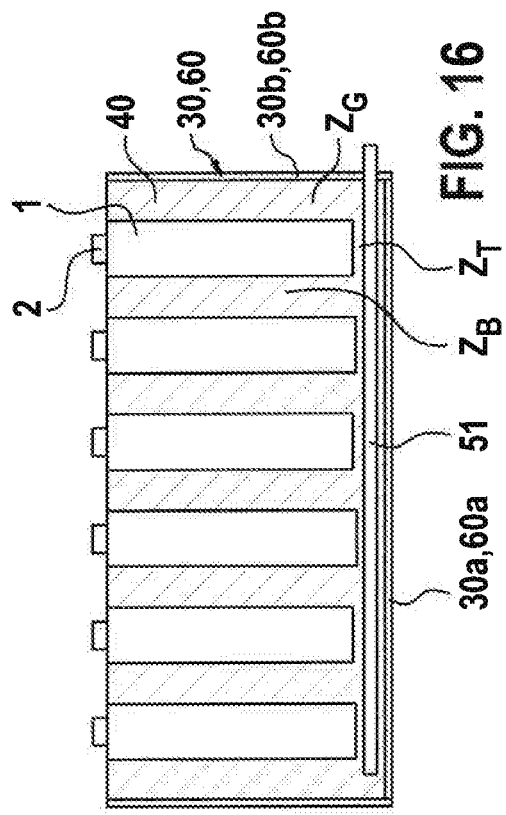
FIGS. 15 to 21 are schematic cross sections to illustrate several further embodiments of a battery system and/or manufacturing method according to the present invention in which battery cells that have been positioned by way of a mounting gripper in the context of manufacture are at least partly potted with at least one potting compound.
Figure 16:
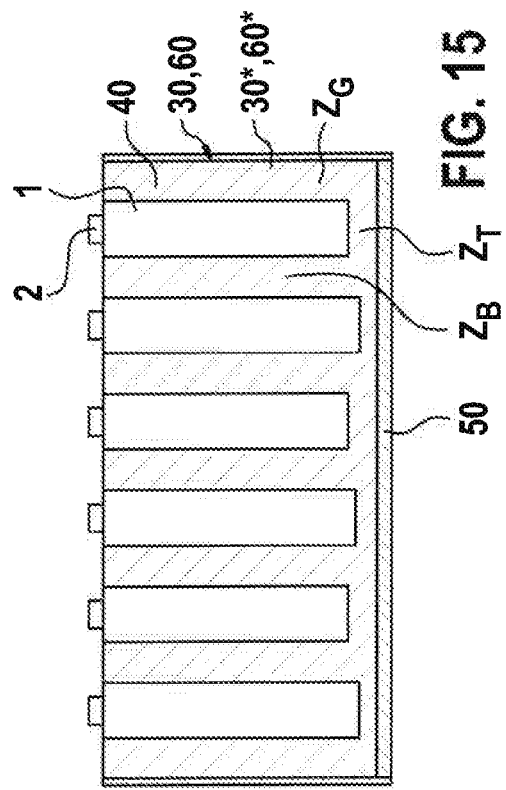
Figure 17:
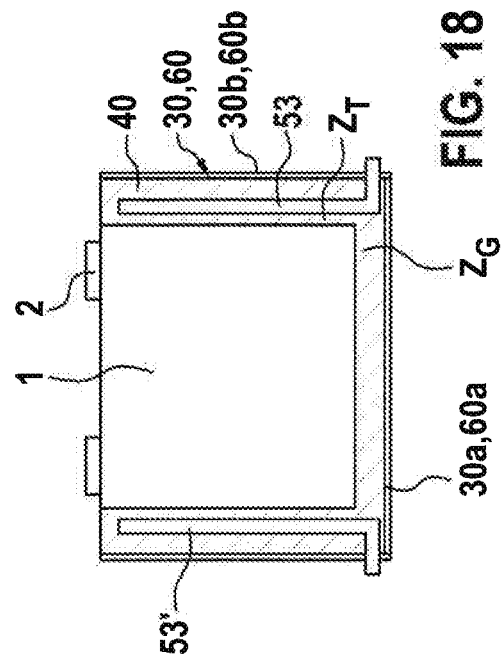
Figure 18:
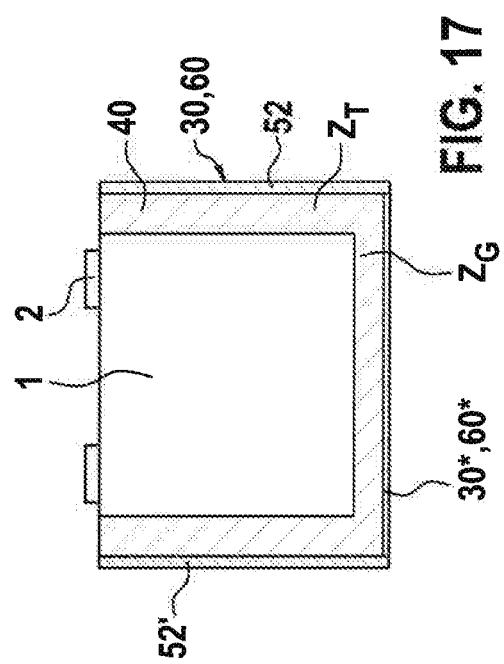
Figure 19:
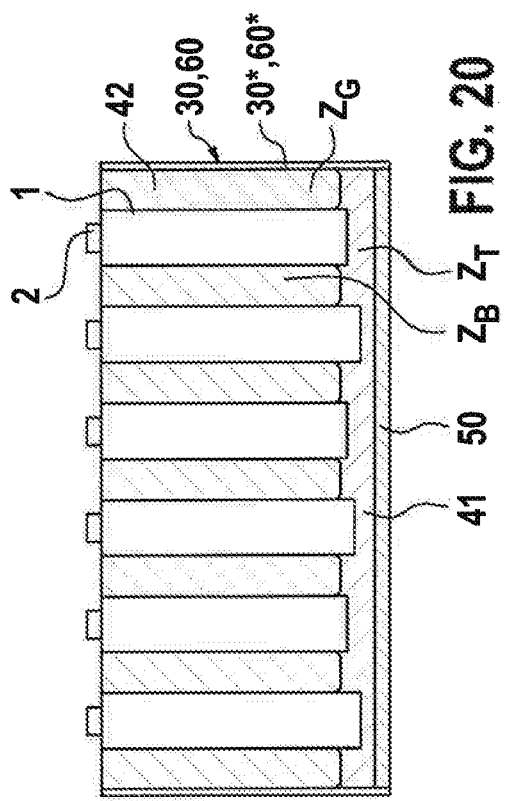
Figure 20:
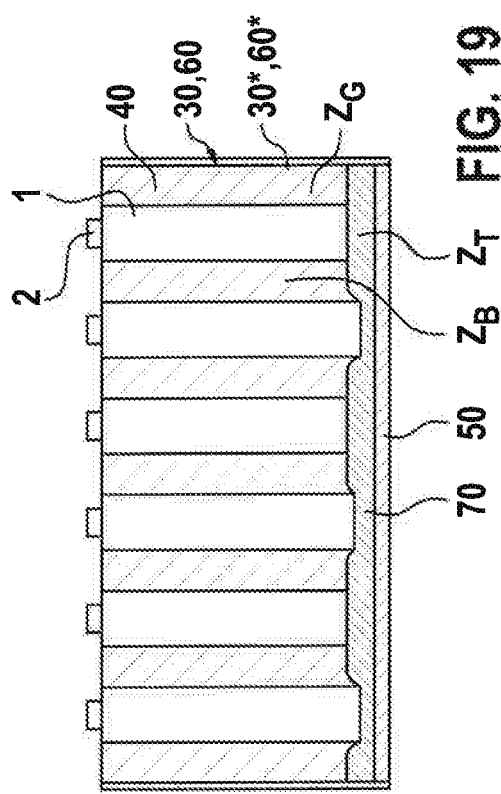
Figure 21:
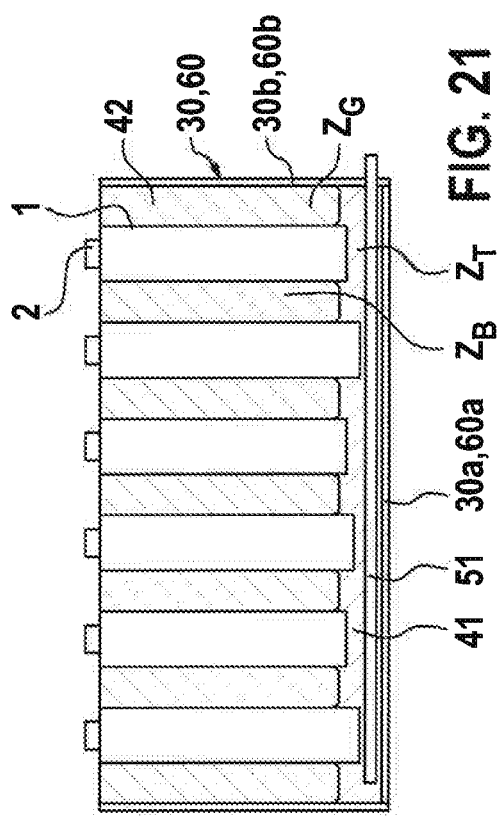

The embodiment shown in FIG. 14 differs from the embodiment shown in FIG. 9 substantially in that—in particular instead of one potting compound 40 (single potting)—a first potting compound 41 and a second potting compound 42 are used (double potting, two-phase potting), temperature control conduit 51 being potted with first potting compound 41, and battery cells 1 being potted with second potting compound 42. In particular, temperature control conduit 51 is potted into first potting compound beneath battery cells 1. Analogously to the embodiment shown in FIG. 13, temperature control apparatus-spacing interstice $Z_T$ is filled with first potting compound 41, battery cell-spacing interstices $Z_B$ as well as housing-spacing or potting mold-spacing interstices $Z_G$ being substantially filled with second potting compound 42. The interior space of battery system housing 30 or of potting mold 60 is, in particular substantially completely, filled up with second potting compound 42. First potting compound 41 and second potting compound 42 can be potted, in particular, wet-in-wet. First potting compound 41 can in particular be thermally conductive and electrically insulating. For example, first potting compound 41 can have a higher thermal conductivity than second potting compound 42, and/or second potting compound 42 can have a higher electrical resistance than first potting compound 41.

FIGS. 15 to 21 are schematic cross sections through several embodiments of a battery system according to the present invention in which battery cells 1 are positioned using a mounting gripper (not depicted) for positioning battery cells 1, and are at least partly potted with at least one potting compound 40; 41, 42. Battery cells 1 have been disposed in that context, by way of the mounting gripper, with a spacing from one another with formation of battery cell-spacing interstices $Z_B$, and with a spacing from battery system housing 30 or from potting mold 60 with formation of housing-spacing or potting mold-spacing interstices $Z_G$, and with a spacing from a temperature control apparatus, for example from a temperature control conduit 51, 53, 53' or from a temperature control plate 50, 52, 52', with formation of at least one temperature control apparatus-spacing interstice $Z_T$. Battery cells 1 are at least partly potted with at least one potting compound 40; 41, 42. FIGS. 15 to 21 show that battery cell-spacing interstices $Z_B$, housing-spacing or potting mold-spacing interstices $Z_G$, and temperature control apparatus-spacing interstices $Z_T$ are filled with at least one potting compound 40; 41, 42. FIGS. 15 to 21 show in particular that battery cells 1 are respectively disposed in an interior space of a battery system housing 30 or of a potting mold 60 which is filled, for example, in particular substantially completely, filled up, with the at least one potting compound 40; 41, 42.

The embodiments shown in FIGS. 15 to 21 respectively differ from the embodiments shown in FIGS. 1, 2, 3, 4, 5, 6 and 7 substantially in that battery cells 1—in particular instead of by way of mounting grids 10, 20—are positioned by way of a mounting gripper, and that the battery systems shown therein therefore have no mounting grids 10, 20.

Figure 22:
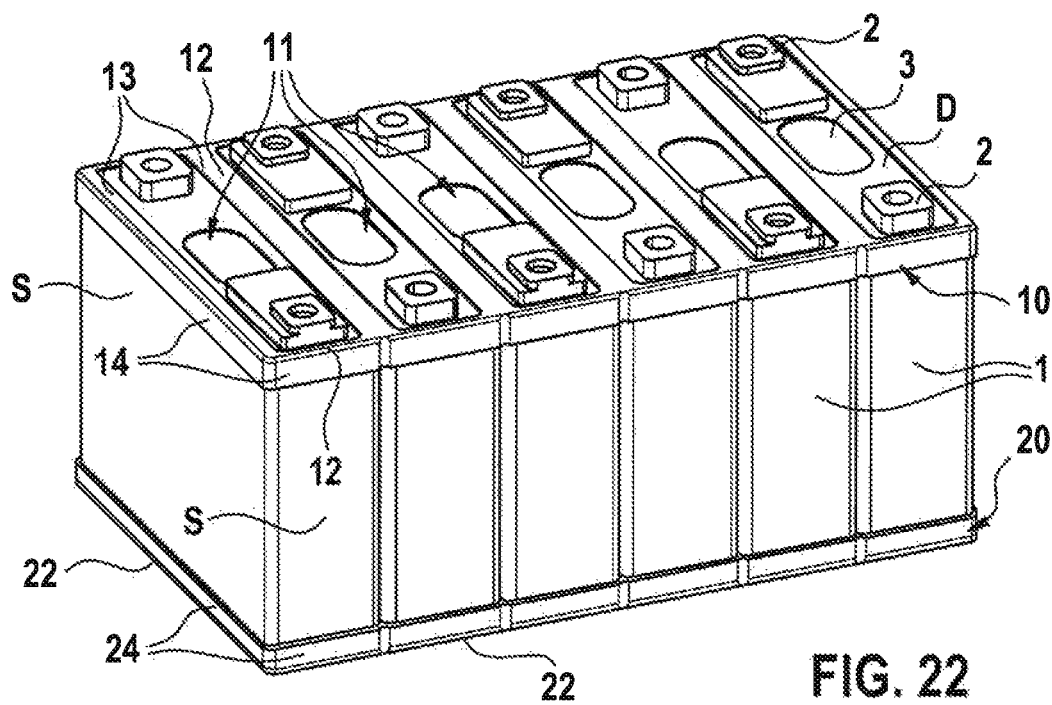
FIGS. 22 to 26 are schematic perspective views to illustrate several further embodiments of a battery system and/or manufacturing method in which battery cells are inserted into an upper and a lower mounting grid.

FIG. 22 is a schematic perspective view to illustrate an embodiment of a battery system and/or manufacturing method according to the present invention in which battery cells 1 are or become inserted into an upper mounting grid 10 for positioning battery cells 1 and into a lower mounting grid 20 for positioning battery cells 1.

FIG. 22 shows that upper mounting grid 10 has grid openings 11 into each of which a battery cell 1 is inserted. Battery cells 1 are each surrounded peripherally by grid opening-forming grid bars 12. Grid openings 11 of upper mounting grid 10 are configured in such a way that terminals 2 and safety valves 3 are exposed therein.

Upper mounting grid 10 and lower mounting grid 20 have vertical 13 and/or lateral stop portions 14, 24 that serve as a stop for battery cells 1 and in particular also for spacing adjacent battery cells 1 apart and/or for spacing battery cells 1 away from a battery system housing or potting mold and/or for spacing battery cells 1 away from a temperature control apparatus.

In the context of the embodiment shown in FIG. 22, vertical 13 and lateral stop portions 14, 24 of upper 10 and lower mounting grid 20 are embodied in the form of frames 13, 14, 24 that respectively extend, proceeding from grid opening-forming grid bars 12, 22, laterally (13) over grid openings 11, or vertically (14, 24) and in particular peripherally around battery cells 1. The frame-like stop portions 13, 14, 24 can in particular cover, in particular wide, edge portions of top surfaces D and/or of lateral surfaces S and/or of the bottom surfaces of battery cells 1 and, for example, a substantial part of top surface D or of the bottom surface of battery cells 1. Such mounting grids 10, 20 can therefore also be referred to in particular as "mounting shells."

Figure 23:
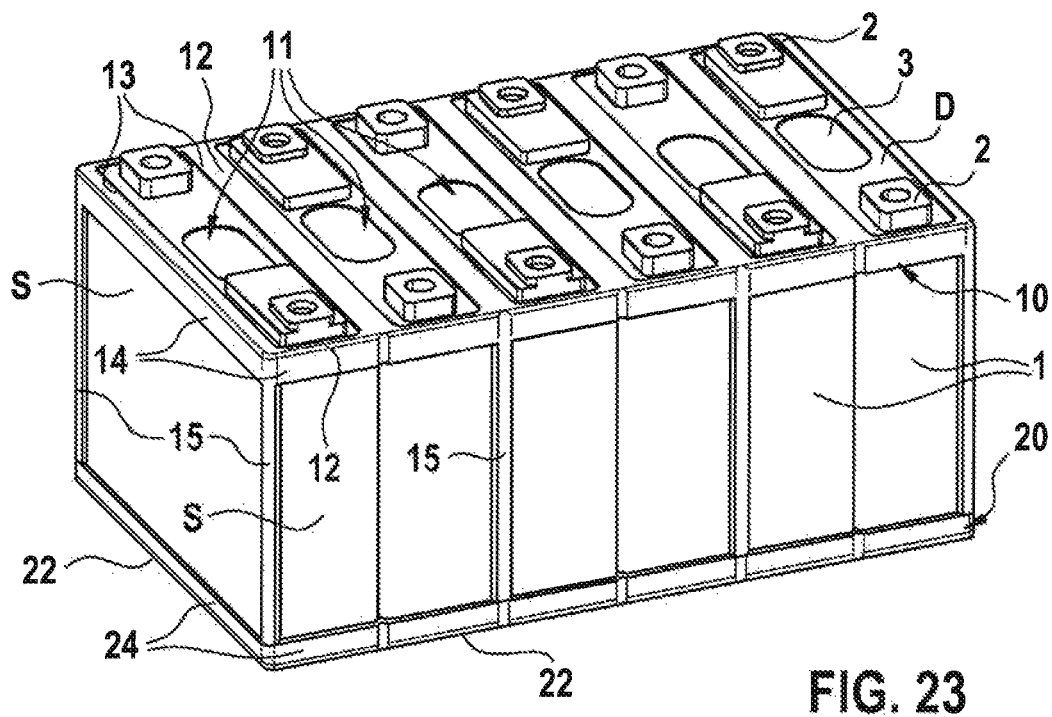

The embodiment shown in FIG. 23 differs from the embodiment shown in FIG. 22 substantially in that upper 10 and/or lower mounting grid 20, for instance upper 10 and/or lower mounting shell 20, has additional spacer portions 15 for spacing adjacent battery cells 1 apart, for example in the form of bars, which portions 15 extend vertically proceeding from a grid opening-forming grid bar 12, in particular proceeding from a corner or a T-shaped piece between several grid opening-forming grid bars 12.

Figure 24:
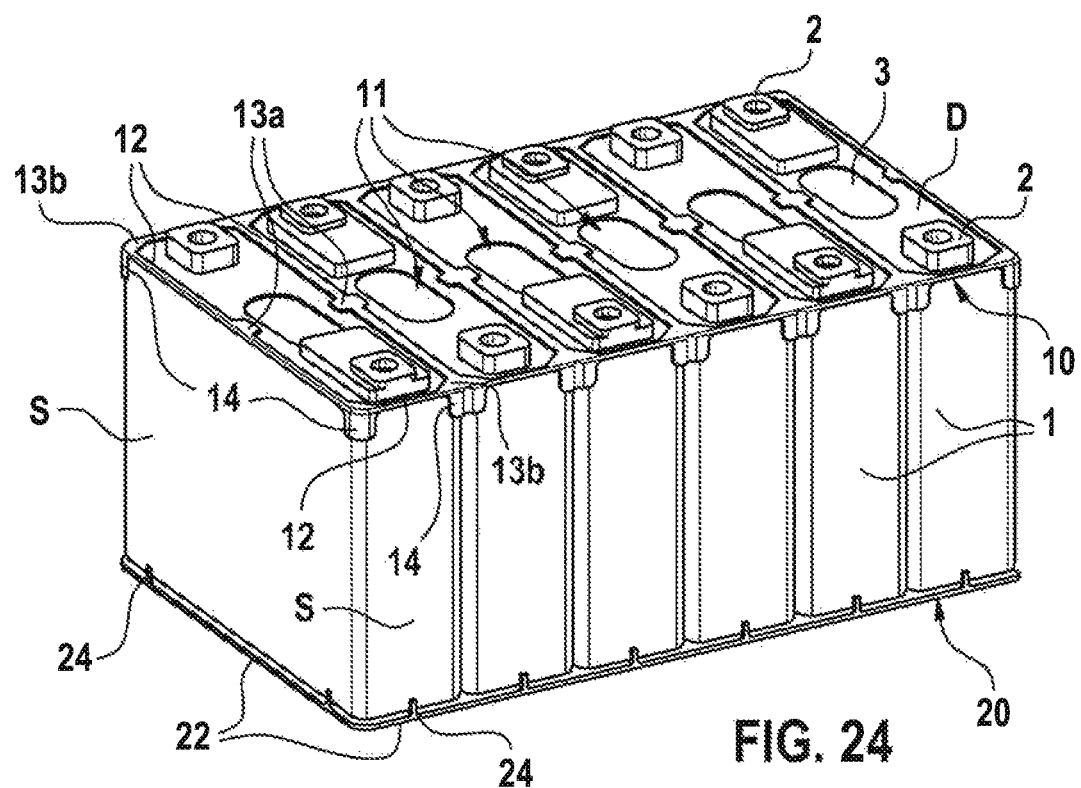

The embodiment shown in FIG. 24 differs from the embodiment shown in FIG. 22 substantially in that upper 10 and/or lower mounting grid 20 has vertical 13a, 13b and lateral stop portions 14, 24 in the form of tabs 13a, 24, which in particular extend, proceeding from a grid opening-forming grid bar 12, 22, laterally (13a) over a grid opening 11 or vertically (14, 24), and/or in the form of corner plateaus 13b which in particular extend over a corner portion between a corner constituted by two grid opening-forming grid bars 12. FIG. 24 illustrates that the tab-shaped and corner plateau-shaped stop portions 13a, 13b, 14, 24 of upper mounting grid 10 cover only, in particular, small surface areas of the edge portions of top surfaces D and/or of lateral surfaces S of battery cells 1, and, for example, top surfaces D of battery cells 1 in grid openings 11 are substantially exposed. Electrical contacting of the battery cells can thereby advantageously be simplified.

Figure 25:
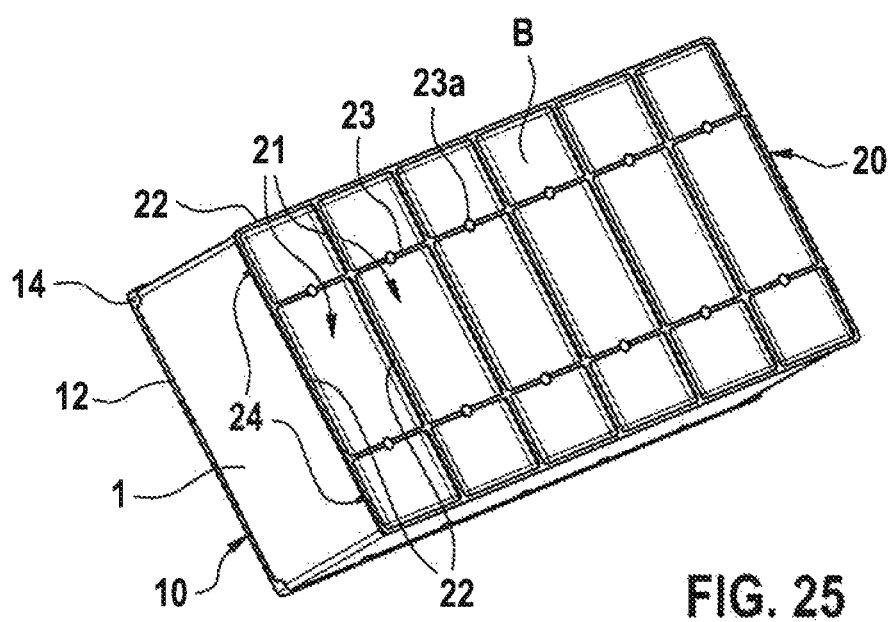

FIG. 25 shows the embodiment shown in FIG. 24 from below, and illustrates that the lower mounting grid also has grid openings 21 into each of which a battery cell 1 is inserted. Battery cells 1 are each surrounded peripherally by grid opening-forming grid bars 22. Lower mounting grid 20 has vertical 23 and lateral stop portions 24 that serve as a stop for battery cells 1 and in particular also for spacing battery cells 1 away from a battery system housing or potting mold and/or for spacing battery cells 1 away from a temperature control apparatus. Vertical stop portions 23 of lower mounting grid 20 are embodied in the form of transverse bars 23 which in particular extend between two grid opening-forming grid bars 22 and delimit grid openings 21 of lower mounting grid 20 at the bottom, and lateral stop portions 24 of lower mounting grid 20 are embodied in the form of tabs 24 that, in particular, extend vertically proceeding from a grid opening-forming grid bar 22. Lower mounting grid 20 furthermore has spacer portions 23a for spacing battery cells 1 away from a battery system housing or from a potting mold or from a temperature control apparatus, in the form of projections 23a embodied on transverse bars 23 and extending outward. FIG. 25 illustrates that the tab-shaped and transverse bar-shaped stop portions 23, 24, as well as the projection-shaped spacer portions 23a of lower mounting grid 20, cover only, in particular, small surface areas of bottom surfaces B of battery cells 1, and that, for example, bottom surfaces B of battery cells 1 in grid openings 21 are substantially exposed. Good heat dissipation via a potting compound molded against bottom surface B of battery cells 1 can thereby advantageously be achieved.

Figure 26:
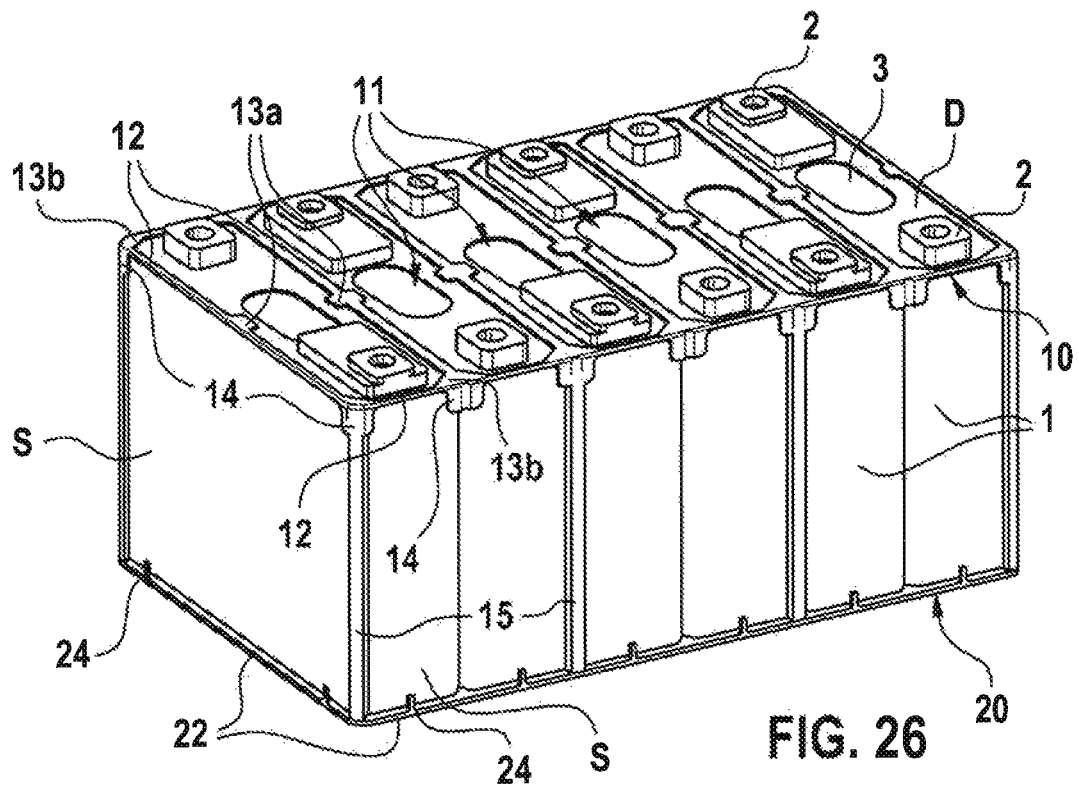

The embodiment shown in FIG. 26 differs from the embodiment shown in FIGS. 24 and 25 substantially in that upper 10 and/or lower mounting grid 20 has additional spacer portions 15 for spacing adjacent battery cells 1 apart, for example in the form of bars, which portions 15 extend vertically proceeding from a grid opening-forming grid bar 12, 22, in particular proceeding from a corner or a T-piece between several grid opening-forming grid bars 12, 22.

Figure 27:
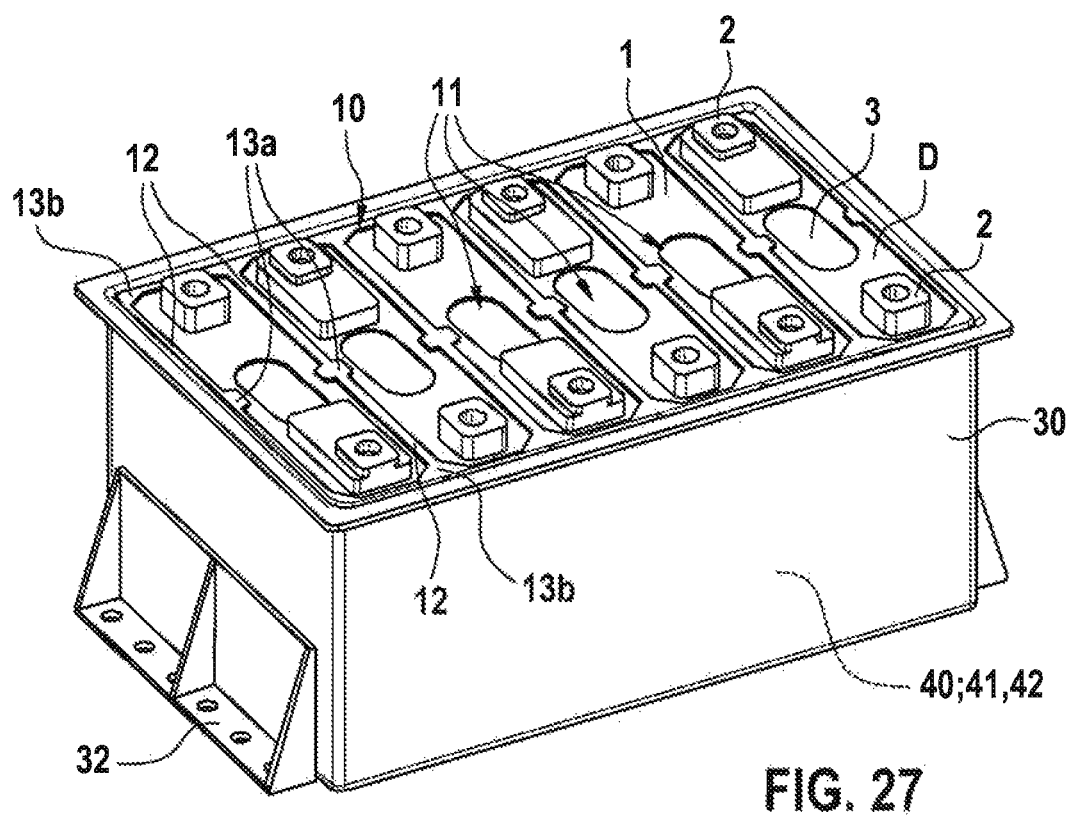
FIG. 27 is a schematic perspective view of a further embodiment of a battery system according to the present invention having a battery system housing having mounting angle pieces for mounting on a temperature control plate, in which battery cells, at least one mounting grid, and the battery system housing are at least partly potted with at least one potting compound, and which is manufacturable from a mounting grid/battery cell assemblage shown in FIGS. 24 to 26.

FIG. 27 is a schematic perspective view of a further embodiment of a battery system according to the present invention which is manufacturable by introducing a mounting grid/battery cell assemblage 10, 20, 1 shown in FIGS. 24 to 26 into the interior space of a, for example metallic, battery system housing 30 having at least one mounting apparatus 32, for example in the form of mounting corner pieces, for mounting on a holding apparatus, for example on a holding plate or holding frame, for instance of a vehicle such as an electric and/or hybrid vehicle, and/or on a temperature control plate, and by at least partly filling, for example filling up, the interior space of the battery system housing 30 with at least one potting compound 40; 41, 42; and in which battery cells 1, at least one mounting grid 10, 20, and battery system housing 30 are at least partly potted with at least one potting compound 40; 41, 42.

Figure 28A:
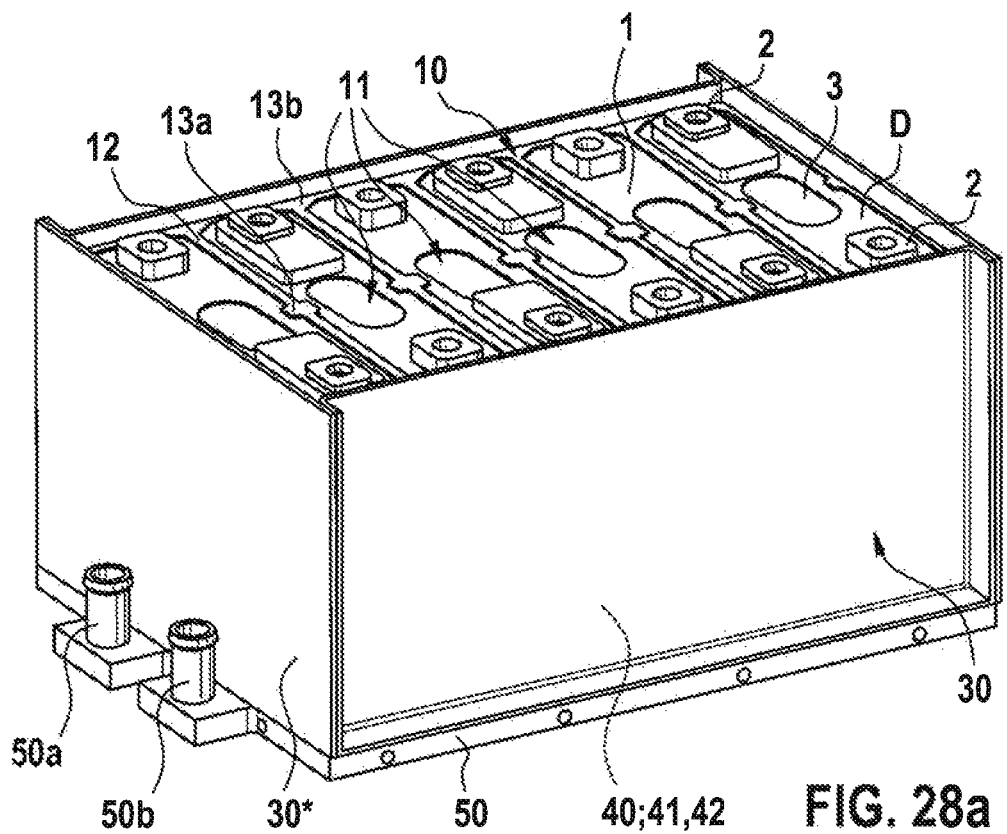
FIGS. 28a, 28b are schematic perspective views of a further embodiment of a battery system according to the present invention having a battery system housing made up of a frame-shaped base element and a temperature control plate premounted thereon and serving as a bottom, in which battery cells, at least one mounting grid, and the battery system housing are at least partly potted with at least one potting compound, and which is manufacturable from a mounting grid/battery cell assemblage shown in FIGS. 24 to 26.
Figure 28B:
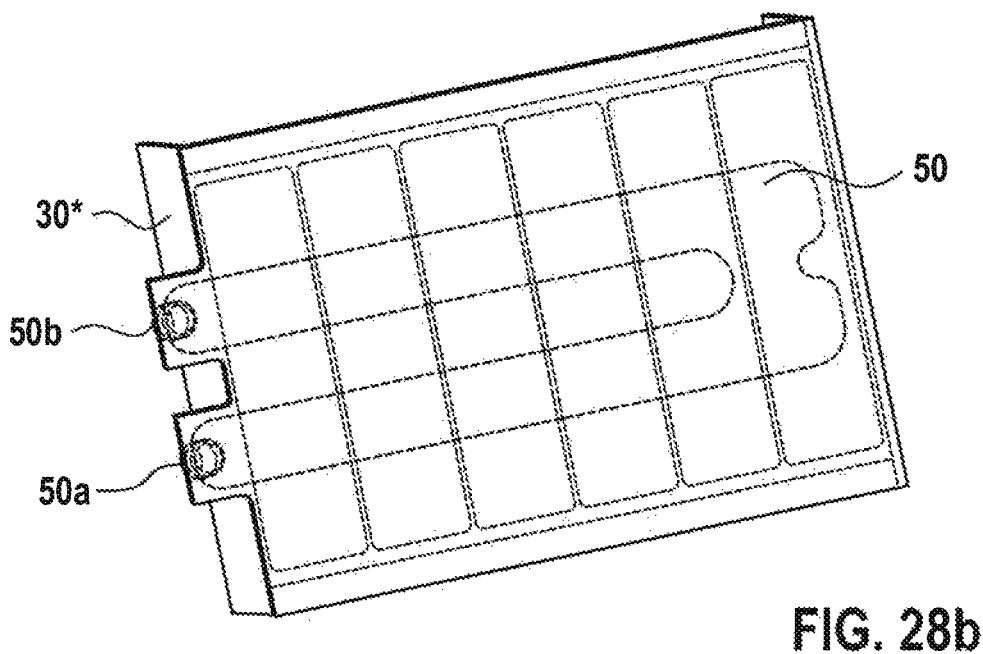

FIGS. 28a and 28b are schematic perspective views of a further embodiment of a battery system according to the present invention which is manufacturable by introducing a mounting grid/battery cell assemblage 10, 20, 1 shown in FIGS. 24 to 26 into the interior space of a, for example metallic, battery system housing 30 made up of a base element 30* in the form of a frame and a temperature control plate 50, fastened thereonto, delimiting the interior space of battery system housing 30, and serving as a bottom of battery system housing 30, and by at least partly filling, for example filling up, the interior space of the battery system housing 30 with at least one potting compound 40; 41, 42; and in which battery cells 1, at least one mounting grid 10, battery system housing 30, in particular temperature control plate 50, and base element 30*, are at least partly potted with at least one potting compound 40; 41, 42. FIGS. 28a and 28b furthermore show that temperature control plate 50 is connectable via temperature control connectors 50a, b outside battery system housing 30.

Figure 29A:
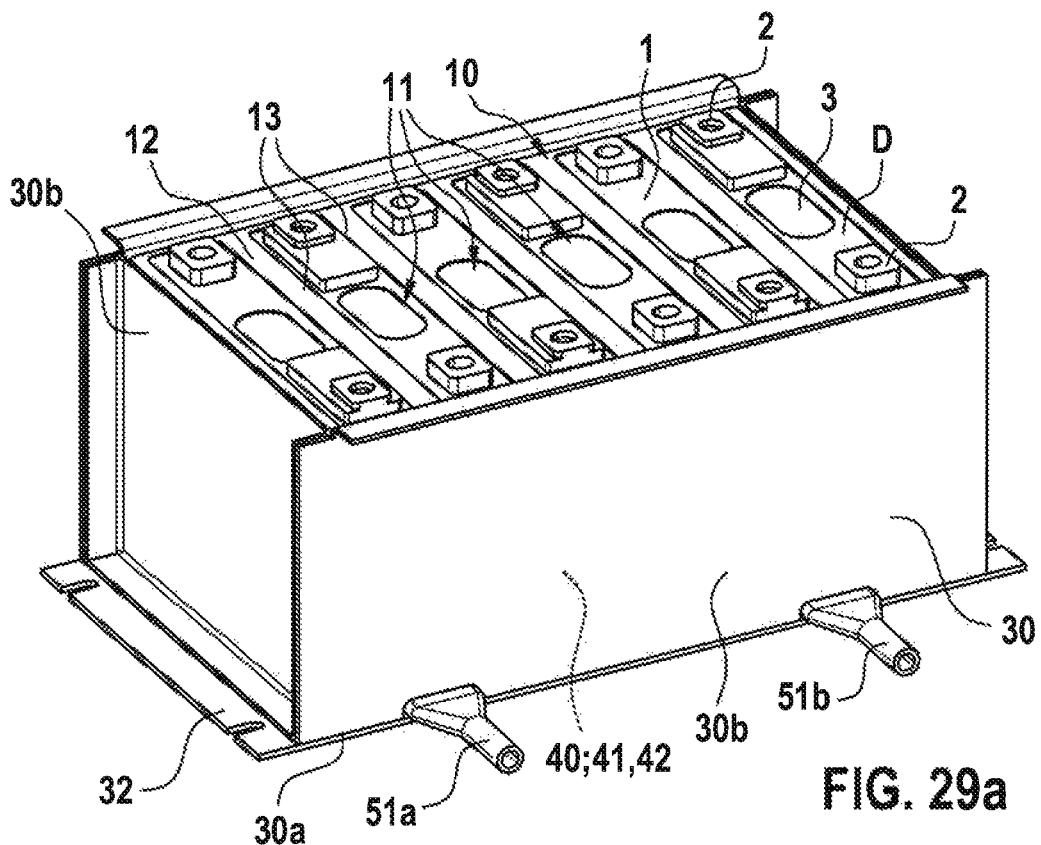
FIGS. 29a, 29b are schematic perspective views of a further embodiment of a battery system according to the present invention having a battery system housing having an, in particular W-shaped, temperature control conduit premounted on its inner bottom surface, in which battery cells, at least one mounting grid, and the battery system housing are at least partly potted with at least one potting compound, and which is manufacturable from a mounting grid/battery cell assemblage shown in FIGS. 22 and 23.
Figure 29B:
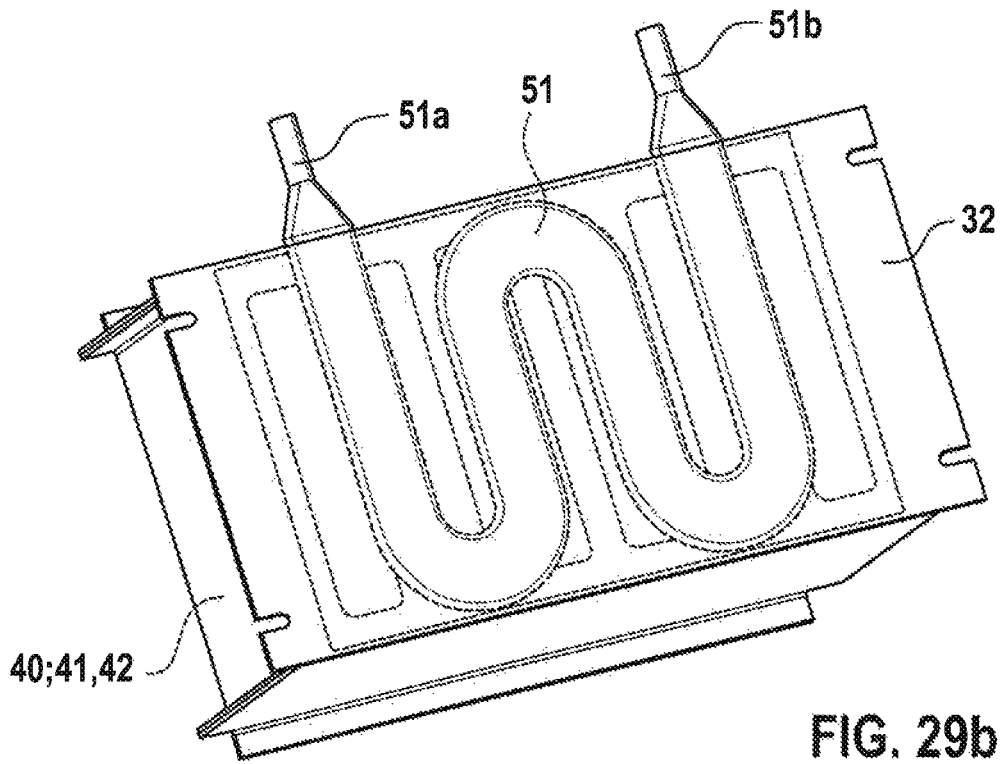

FIGS. 29a and 29b are schematic perspective views of a further embodiment of a battery system according to the present invention which is manufacturable by introducing a mounting grid/battery cell assemblage 10, 20, 1 shown in FIGS. 22 and 23 into the interior space of a, for example metallic, battery system housing 30 having an, in particular W-shaped, temperature control conduit 51, for instance in the form of a W-shaped serpentine, fastened on its inner bottom surface 30a, and having at least one mounting apparatus 32, for example a mounting plate, for mounting on a holding apparatus, for example on a holding plate or holding frame, for instance of a vehicle such as an electric and/or hybrid vehicle, and by at least partly filling, for example filling up, the interior space of the battery system housing 30 with at least one potting compound 40; 41, 42; and in which battery cells 1, at least one mounting grid 10, temperature control conduit 51, and battery system housing 30 are at least partly potted with at least one potting compound 40; 41, 42. FIGS. 29a and 29b furthermore show that temperature control conduit 51 is connectable via temperature control connectors 51a, b outside battery system housing 30, temperature control conduit 51 being passed through a side wall 30b of battery system housing 30.

Figure 30A:
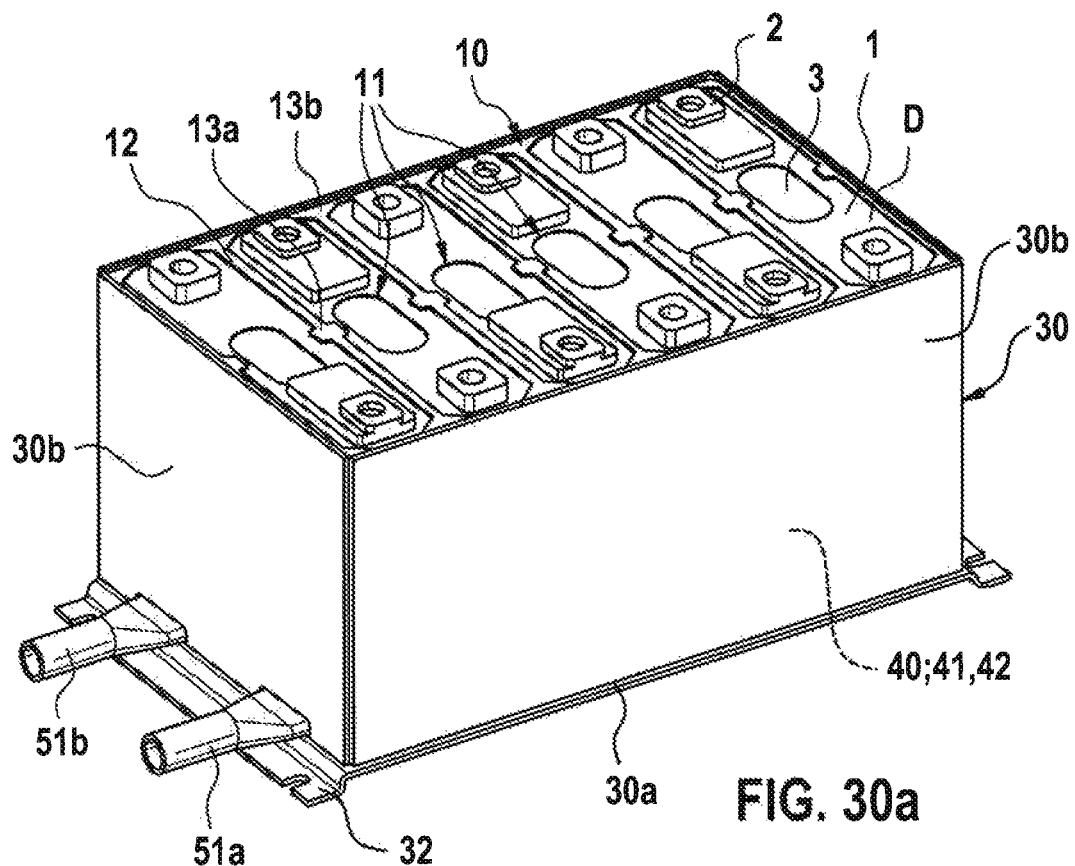
FIGS. 30a, 30b are schematic perspective views of a further embodiment of a battery system according to the present invention having a battery system housing having an, in particular U-shaped, temperature control conduit premounted on its inner bottom surface, in which battery cells, at least one mounting grid, and the battery system housing are at least partly potted with at least one potting compound, and which is manufacturable from a mounting grid/battery cell assemblage shown in FIGS. 24 to 26.
Figure 30B:
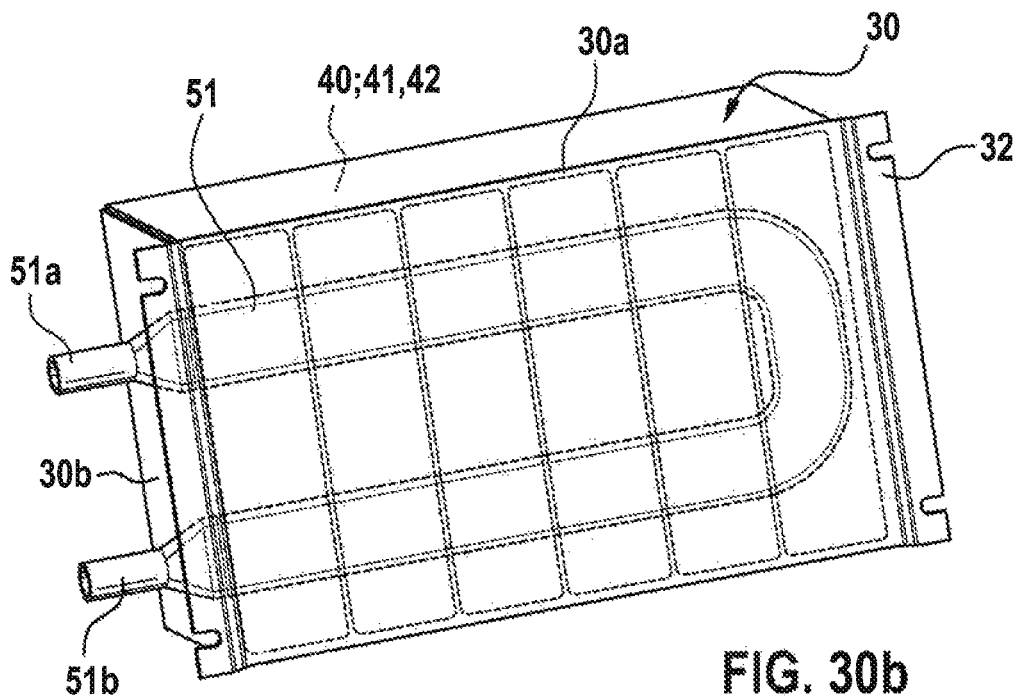

FIGS. 30a and 30b are schematic perspective views of a further embodiment of a battery system according to the present invention which is manufacturable by introducing a mounting grid/battery cell assemblage 10, 20, 1 shown in FIGS. 24 to 26 into the interior space of a, for example metallic, battery system housing 30 and by at least partly filling, for example filling up, the interior space with at least one potting compound 40; 41, 42, battery system housing 30 having an, in particular U-shaped, temperature control conduit 51 fastened on its inner bottom surface 30a, as well as at least one mounting apparatus 32, for example a mounting plate. Battery cells 1, the at least one mounting grid 10, temperature control conduit 51, and battery system housing 30 are at least partly potted with at least one potting compound 40; 41, 42. FIGS. 30a and 30b furthermore show that temperature control conduit 51 is connectable via temperature control connectors 51a, b outside battery system housing 30, temperature control conduit 51 being passed through a side wall 30b of battery system housing 30.

Figure 31:
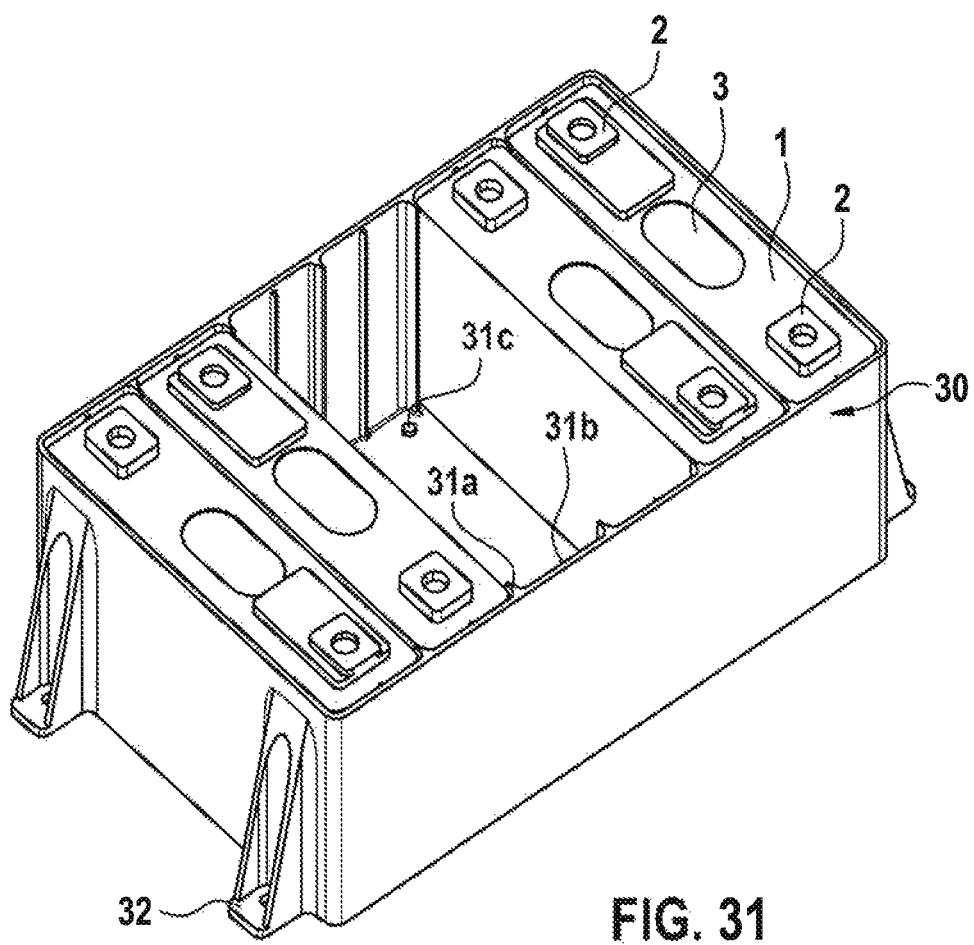
FIG. 31 is a schematic perspective view to illustrate a further embodiment of a battery system and/or manufacturing method according to the present invention, in which battery cells are inserted into a battery system housing having positioning ribs and/or positioning projections.

FIG. 31 is a schematic perspective view to illustrate an embodiment of a battery system and/or manufacturing method in which battery cells 1 are or become inserted into a battery system housing 30, for example made of plastic, having positioning ribs 31a, 31b and/or positioning projections 31c for positioning battery cells 1 and having at least one mounting apparatus 32, for example mounting tabs, for mounting on a holding apparatus, for example on a holding plate or holding frame, for instance of a vehicle such as an electric and/or hybrid vehicle, and/or on a temperature control plate.

Figure 32A:
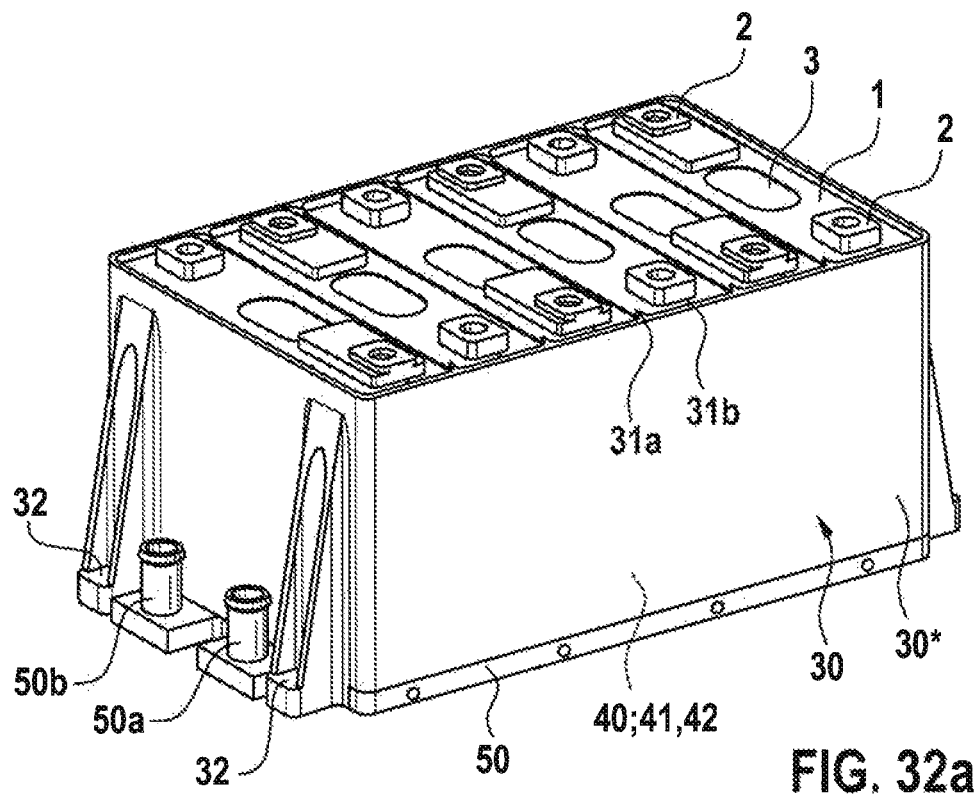
FIGS. 32a, 32b are schematic perspective views of a further embodiment of a battery system according to the present invention having a battery system housing having positioning ribs and/or positioning projections made of a frame-shaped base element and a temperature control plate premounted thereon and serving as a bottom, in which battery cells and the battery system housing are at least partly potted with at least one potting compound.
Figure 32B:
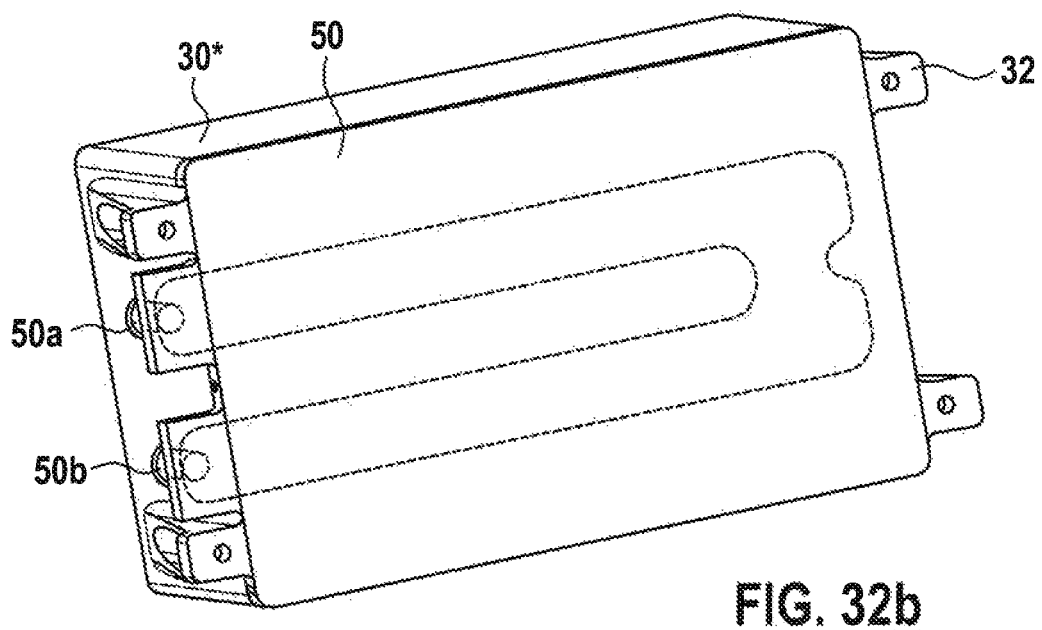

FIGS. 32a and 32b are schematic perspective views of a further embodiment of a battery system according to the present invention which is manufacturable by inserting battery cells 1 into a battery system housing 30, for example made of plastic, and by at least partly filling, for example filling up, the interior space of battery system housing 30 with at least one potting compound 40; 41, 42, battery system housing 30 having positioning ribs 31a, 31b and/or positioning projections 31c, a frame-shaped base element 30*, and a temperature control plate 50 fastened thereonto and serving as a bottom, as well as at least one mounting apparatus 32, for example mounting tabs, for mounting on a holding apparatus, for example on a holding plate or holding frame, for instance of a vehicle such as an electric and/or hybrid vehicle. Battery cells 1 and battery system housing 30, in particular temperature control plate 50 and base element 30*, are at least partly potted with at least one potting compound 40; 41, 42. FIGS. 32a and 32b furthermore show that temperature control plate 50 is connectable via temperature control connectors 50a, b outside battery system housing 30.

Figure 33A:
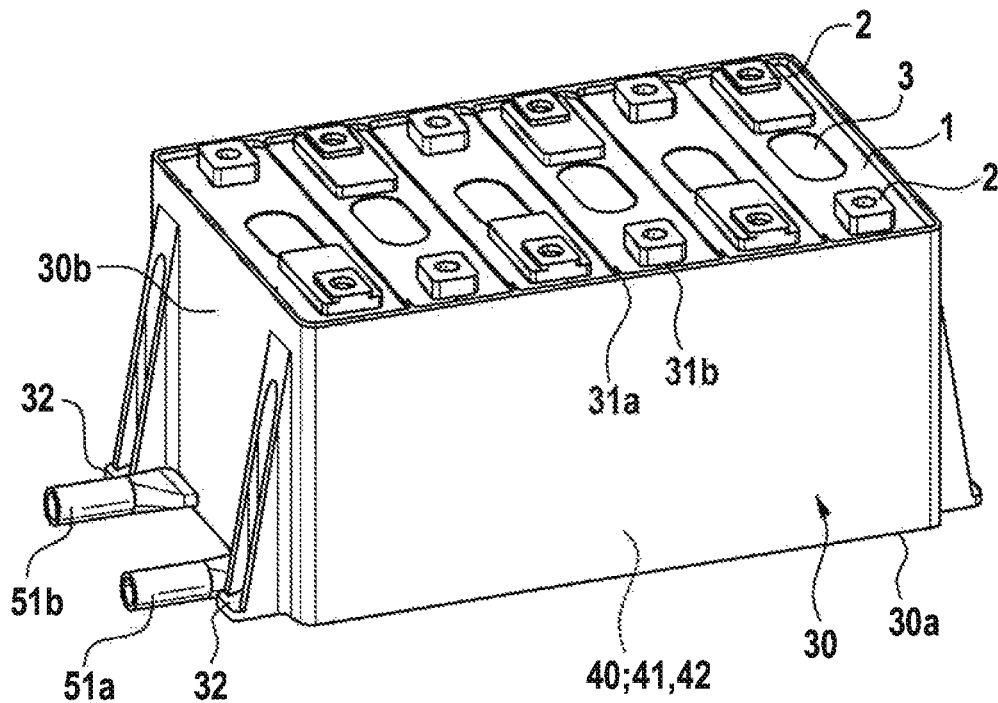
FIGS. 33a, 33b are schematic perspective views of a further embodiment of a battery system according to the present invention having a battery system housing having positioning ribs and/or positioning projections and having an, in particular U-shaped, temperature control conduit premounted on its inner bottom surface, in which battery cells, the temperature control conduit, and the battery system housing are at least partly potted with at least one potting compound.
Figure 33B:
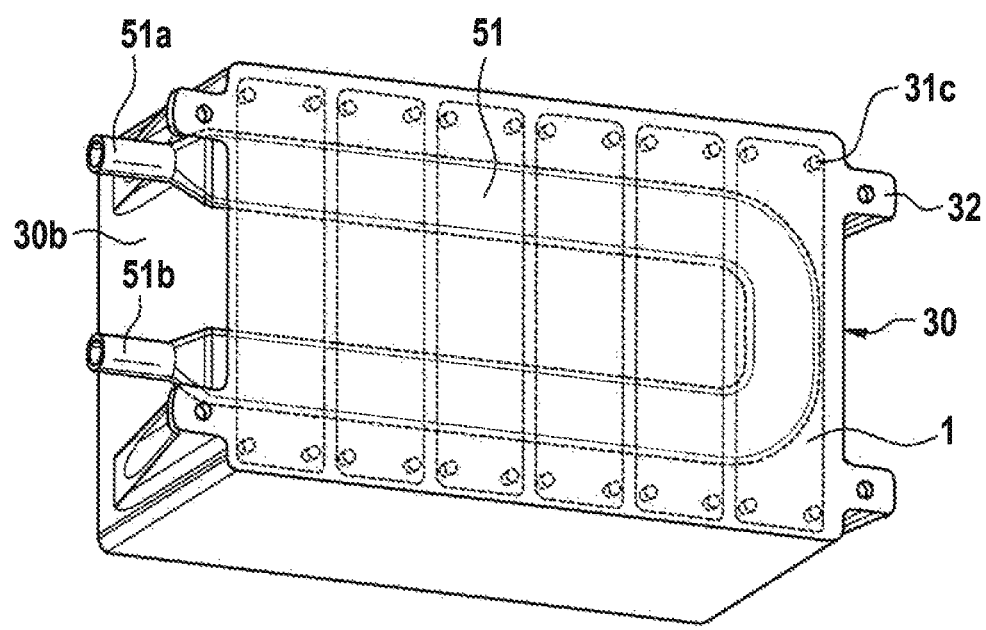

FIGS. 33a and 33b are schematic perspective views of a further embodiment of a battery system according to the present invention which is manufacturable by inserting battery cells 1 into a battery system housing 30, for example made of plastic, and by at least partly filling, for example filling up, the interior space of battery system housing 30 with at least one potting compound 40; 41, 42, battery system housing 30 having positioning ribs 31*a*, 31*b* and/or positioning projections 31*c* and an, in particular U-shaped, temperature control conduit 51, for instance in the form of a U-shaped serpentine, fastened onto its inner bottom surface, as well as at least one mounting apparatus 32, for example mounting tabs, for mounting on a holding apparatus, for example on a holding plate or holding frame, for instance of a vehicle such as an electric and/or hybrid vehicle. Battery cells 1, temperature control conduit 51, and battery system housing 30 are at least partly potted with at least one potting compound 40; 41, 42. FIGS. 33*a* and 33*b* furthermore show that temperature control conduit 51 is connectable via temperature control connectors 51*a, b* outside battery system housing 30, temperature control conduit 51 being passed through a side wall 30*b* of battery system housing 30.

FIG. 34 is a schematic perspective view to illustrate a further embodiment of a battery system and/or manufacturing method, having a battery system housing 30 made up of a base element 30* and two temperature control plates 52, 52' fastened onto said element 30* on oppositely located sides and serving as side walls, in which battery cells 1 and battery system housing 30, in particular temperature control plates 52, 52' and base element 30*, are at least partly potted with at least one potting compound.

FIGS. 35*a* and 35*b* are schematic cross sections to illustrate a further embodiment of a battery system and/or manufacturing method according to the present invention, having a battery system housing 30 having two temperature control conduits 53, 53' fastened on inner surfaces of oppositely located side walls 30*b*, 30*b*' of battery system housing 30, in which battery cells 1 and temperature control conduits 53, 53' and battery system housing 30 are at least partly potted with a potting compound 40; 41, 42. FIGS. 35*a* and 35*b* furthermore indicate that temperature control conduits 53, 53' are partly embedded into, for example clamped into or molded onto, the material of a respective side wall 30*b*, 30*b*' of battery system housing 30.

What is claimed is:

1. A method for manufacturing a battery system, the method comprising:
    positioning battery cells at least one of by at least one mounting grid for positioning the battery cells, by positioning ribs, by positioning projections in an interior space of a battery system housing or of a potting mold which are configured for positioning the battery cells, and by a mounting gripper for positioning the battery cells; and
    at least partly potting the battery cells with at least one potting compound;
    wherein the battery cells are positioned by the at least one mounting grid and/or by the positioning ribs and/or the positioning projections and/or by the mounting gripper with a spacing from one another with formation of at least one battery cell-spacing interstice, and/or with a spacing from the battery system housing or from the potting mold with formation of at least one housing-spacing or a potting mold-spacing interstice, and/or with a spacing from a temperature control device with formation of at least one temperature control apparatus-spacing interstice, the at least one battery cell-spacing interstice and/or the at least one housing-spacing or potting mold-spacing interstice and/or the at least one temperature control apparatus-spacing interstice being filled, after introduction and positioning of the battery cells, with at least one potting compound.

2. The method of claim 1, wherein the battery cells are introduced into an interior space of the battery system housing or of the potting mold, and/or of the interior space of the battery system housing or of the potting mold is filled at least partly with at least one potting compound.

3. The method of claim 1, wherein the at least one temperature control apparatus-spacing interstice is filled with a first potting compound, and the at least one battery cell-spacing interstice and/or the at least one housing-spacing or potting mold-spacing interstice being filled with a second potting compound wet-in-wet; or an elastomer mat or an elastomer pad, being disposed in the at least one temperature control apparatus-spacing interstice, and the at least one battery cell-spacing interstice and/or the at least one housing-spacing or potting mold-spacing interstice being filled with a potting compound; or the at least one temperature control apparatus-spacing interstice, the at least one battery cell-spacing interstice, and the at least one housing-spacing or potting mold-spacing interstice being filled with a potting compound.

4. A method for manufacturing a battery system, the method comprising:
    positioning battery cells at least one of by at least one mounting grid for positioning the battery cells, by positioning ribs, by positioning projections in an interior space of a battery system housing or of a potting mold which are configured for positioning the battery cells, and by a mounting gripper for positioning the battery cells; and
    at least partly potting the battery cells with at least one potting compound;
    wherein the battery cells are inserted into the at least one mounting grid, into an upper mounting grid for positioning battery cells and into a lower mounting grid for positioning battery cells, a mounting grid/battery cell assemblage being constituted by insertion of the battery cells into the at least one mounting grid, which assemblage is introduced into the interior space of the battery system housing or of the potting mold; and/or the battery cells being inserted between the positioning ribs and/or positioning projections into the interior space of the battery system housing or of the potting mold; and/or the battery cells being grasped by the mounting gripper and introduced by the mounting gripper into the interior space of the battery system housing or of the potting mold.

5. A method for manufacturing a battery system, the method comprising:
    positioning battery cells at least one of by at least one mounting grid for positioning the battery cells, by positioning ribs, by positioning projections in an interior space of a battery system housing or of a potting mold which are configured for positioning the battery cells, and by a mounting gripper for positioning the battery cells; and
    at least partly potting the battery cells with at least one potting compound;
    wherein at least one temperature control conduit is introduced, before introduction of the battery cells, into the interior space of the battery system housing or of the potting mold, the at least one temperature control conduit) also being at least partly potted with at least one potting compound.

6. The method of claim 5, wherein the at least one temperature control conduit is disposed alongside and/or below the battery cells, the at least one temperature control conduit being fastened on an inner surface of at least one side wall and/or of a bottom of the battery system housing or of the potting mold.

7. A method for manufacturing a battery system, the method comprising:
positioning battery cells at least one of by at least one mounting grid for positioning the battery cells, by positioning ribs, by positioning projections in an interior space of a battery system housing or of a potting mold which are configured for positioning the battery cells, and by a mounting gripper for positioning the battery cells; and
at least partly potting the battery cells with at least one potting compound;
wherein the battery system housing or the potting mold is assembled from a base element and from at least one temperature control plate delimiting the interior space of the battery system housing or of the potting mold, serving as a side wall and/or bottom of the battery system housing or of the potting mold, the at least one temperature control plate also being at least partly potted with at least one potting compound.

8. A method for manufacturing a battery system, the method comprising:
positioning battery cells at least one of by at least one mounting grid for positioning the battery cells, by positioning ribs, by positioning projections in an interior space of a battery system housing or of a potting mold which are configured for positioning the battery cells, and by a mounting gripper for positioning the battery cells; and
at least partly potting the battery cells with at least one potting compound;
wherein the at least one potting compound encompasses:
at least one epoxy resin based on bisphenol A and/or bisphenol F;
a bisphenol-A and/or -F epoxy-based formulation having silicone elastomer particles; and
at least one amine hardener;
wherein:
the at least one amine hardener encompassing or being at least one polyamine and/or at least one polyamidoamine; and/or
in the formulation, epoxy units being chemically bonded to silicone units which form the silicone elastomer particles, the formulation encompassing silicone elastomer particles whose interior is constituted by silicone units and whose exterior is constituted by epoxy units; and/or
the potting compound furthermore encompassing at least one thermally conductive filler.

9. The method of claim 8, wherein the at least one amine hardener encompasses or is at least one polyamine and/or at least one polyamidoamine; and/or in the formulation, epoxy units being chemically bonded to silicone units which form the silicone elastomer particles, the formulation encompassing silicone elastomer particles whose interior is constituted by silicone units and whose exterior is constituted by epoxy units; and/or the potting compound encompassing at least one thermally conductive filler of aluminum hydroxide and/or aluminum oxide and/or silicon dioxide and/or boron nitride; and/or the potting compound encompassing at least one additive.

10. The method of claim 8, wherein the potting compound, based on the total weight of the potting compound, encompasses:
≥9 wt % to ≤77 wt % of the at least one epoxy resin based on bisphenol A and/or bisphenol F;
≥4 wt % to ≤40 wt % of the at least one amine hardener;
≥0.1 wt % to ≤35 wt % of the bisphenol A- and/or -F epoxy-based formulation having silicone elastomer particles;
≥0 wt % to ≤85 wt % of at least one thermally conductive filler of the potting compound; and
≥0 wt % to ≤1 wt % the at least one additive.

11. The method of claim 8, wherein the potting compound, based on the total weight of the potting compound, encompasses:
≥9 wt % to ≤30 wt % of the at least one epoxy resin based on bisphenol A and/or bisphenol F;
≥4 wt % to ≤12 wt % of the at least one amine hardener;
≥3 wt % to ≤15 wt % of the bisphenol A- and/or -F epoxy-based formulation having silicone elastomer particles;
≥50 wt % to ≤85 wt % of at least one thermally conductive filler of the potting compound; and
≥0.2 wt % to ≤0.7 wt % of the at least one additive.

12. The method of claim 8, wherein the bisphenol-A and/or -F epoxy-based formulation having the silicone elastomer particles is the bisphenol-A epoxy-based formulation having the silicone elastomer particles.

13. The method of claim 8, wherein the at least one thermally conductive filler includes aluminum hydroxide and/or aluminum oxide and/or silicon dioxide and/or boron nitride.

14. A method for manufacturing a battery system, the method comprising:
positioning battery cells at least one of by at least one mounting grid for positioning the battery cells, by positioning ribs, by positioning projections in an interior space of a battery system housing or of a potting mold which are configured for positioning the battery cells, and by a mounting gripper for positioning the battery cells; and
at least partly potting the battery cells with at least one potting compound;
where the method further comprises:
providing at least one temperature control conduit alongside and/or below the battery cells; and/or
providing at least one temperature control plate that forms at least one side wall and/or the bottom of the battery system housing encompassing the battery cells or of a potting-compound unit formed by the potting step and encompassing the battery cells;
wherein (a) the battery cells and (b) the at least one mounting grid, the positioning ribs, positioning projections, the at least one temperature control conduit, and/or the at least one temperature control plate are at least partly potted with the at least one potting compound.

15. The method of claim 14, wherein the at least one mounting grid, the positioning ribs, positioning projections of the battery system housing, the battery system housing, the at least one temperature control conduit, and/or the at least one temperature control plate is embodied from plastic.

16. The method of claim 14, wherein the battery cells are positioned by the at least one mounting grid and/or by the positioning ribs and/or positioning projections with a spacing from one another with formation of at least one battery cell-spacing interstice, and/or with a spacing from the battery system housing or from an outer side of the potting-compound unit encompassing the battery cells, with formation of at least one housing-spacing or potting-compound unit outer side-spacing interstice, and/or with a spacing from the at least one temperature control conduit and/or temperature control plate, with formation of at least one temperature control apparatus-spacing interstice, the at least one battery cell-spacing interstice and/or the at least one housing-spacing or potting-compound unit outer side-spacing interstice and/or the at least one temperature control apparatus-spacing interstice being filled with the at least one potting compound.

17. The method of claim 16, wherein the at least one temperature control apparatus-spacing interstice is filled with a first potting compound, and the at least one battery cell-spacing interstice and the at least one housing-spacing or potting-compound unit outer side-spacing interstice is filled with a second potting compound.

18. The method of claim 16, wherein an elastomer mat or an elastomer pad preform is disposed in the at least one temperature control apparatus-spacing interstice, and the at least one battery cell-spacing interstice and/or the at least one housing-spacing or potting-compound unit outer side-spacing interstice is filled with a potting compound.

19. The method of claim 16, wherein the at least one temperature control apparatus-spacing interstice, the at least one battery cell-spacing interstice, and the at least one housing-spacing or potting-compound unit outer side-spacing interstice are filled with a potting compound.

20. The method of claim 14, wherein:
the at least one potting compound includes:
at least one epoxy resin based on bisphenol A and/or bisphenol F;
a bisphenol-A and/or -F epoxy-based formulation having silicone elastomer particles; and
at least one amine hardener; and
at least one of the following:
the at least one amine hardener encompasses or being at least one polyamine and/or at least one polyamidoamine;
in the formulation, epoxy units being chemically bonded to silicone units which form the silicone elastomer particles, the formulation encompassing silicone elastomer particles whose interior is constituted by silicone units and whose exterior is constituted by epoxy units; and
the potting compound furthermore encompassing at least one thermally conductive filler.

21. The method of claim 20, wherein the at least one thermally conductive filler includes aluminum hydroxide and/or aluminum oxide and/or silicon dioxide and/or boron nitride.

22. The method of claim 14, wherein the at least one mounting grid has grid openings into which a battery cell is respectively inserted; and/or the battery system has an upper mounting grid for positioning battery cells and a lower mounting grid for positioning battery cells.

23. The method of claim 14, wherein the at least one mounting grid has an upper mounting grid and a lower mounting grid, and grid openings of the upper mounting grid are configured so that the terminals and safety valves of the battery cells are exposed therein.

24. The method of claim 14, wherein the battery cells each have solid or rigid metallic cell housing.

* * * * *